United States Patent
Peddaneni et al.

(10) Patent No.: US 12,200,809 B2
(45) Date of Patent: Jan. 14, 2025

(54) METHOD AND APPARATUS FOR OPTIMAL USER EQUIPMENT (UE) POWER CONSUMPTION IN NEW RADIO (NR) CONNECTED DISCONTINUOUS RECEPTION (C-DRX) MODE

(71) Applicant: Apple Inc., Cupertino, CA (US)

(72) Inventors: Hemanth Peddaneni, San Diego, CA (US); Bin Hu, San Diego, CA (US); Erdogan Dede, San Diego, CA (US)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 17/676,436

(22) Filed: Feb. 21, 2022

(65) Prior Publication Data

US 2022/0394809 A1    Dec. 8, 2022

Related U.S. Application Data

(60) Provisional application No. 63/208,035, filed on Jun. 8, 2021.

(51) Int. Cl.
*H04W 76/28* (2018.01)
*H04W 52/02* (2009.01)

(52) U.S. Cl.
CPC ........... *H04W 76/28* (2018.02); *H04W 52/02* (2013.01)

(58) Field of Classification Search
None
See application file for complete search history.

(56) References Cited

U.S. PATENT DOCUMENTS

| | | | |
|---|---|---|---|
| 2015/0341884 A1* | 11/2015 | Das | H04W 56/0035 370/311 |
| 2016/0192433 A1* | 6/2016 | Deenoo | H04W 24/08 370/329 |
| 2018/0338281 A1* | 11/2018 | Bangolae | H04W 68/02 |
| 2019/0313331 A1* | 10/2019 | Zhang | H04W 52/0225 |
| 2020/0107266 A1* | 4/2020 | Liao | H04W 76/28 |
| 2020/0112919 A1* | 4/2020 | Nam | H04L 5/001 |
| 2020/0245395 A1* | 7/2020 | Zhang | H04W 76/19 |

(Continued)

OTHER PUBLICATIONS

Impact of DRX on VoIP Performance and Battery Life in LTE; Waqas Ahmad Khan; Nov. 2008.

(Continued)

*Primary Examiner* — San Htun
(74) *Attorney, Agent, or Firm* — Eschweiler & Potashnik, LLC

(57) ABSTRACT

A user equipment (UE) configured for discontinuous reception (DRX) operation, is disclosed. The UE comprises one or more processors configured to perform a static DRX update by aggregating all DRX timers configured for the UE during each slot of one or more consecutive slots associated with a radio frame structure, until it is determined that all the DRX timers are expiring in a select slot of the one or more consecutive slots. The one or more processors is further configured to compute an end of DRX active time, upon performing the static DRX update in the select slot; and perform a dynamic DRX event aggregation responsive to determining that all DRX events associated with physical downlink control channel (PDCCH) monitoring occasions (MOs) within the computed end of DRX active time have not been received.

20 Claims, 15 Drawing Sheets

(56) References Cited

U.S. PATENT DOCUMENTS

| | | | |
|---|---|---|---|
| 2022/0046744 A1* | 2/2022 | Bao | H04W 72/23 |
| 2022/0124765 A1* | 4/2022 | Li | H04W 52/0216 |
| 2022/0191793 A1* | 6/2022 | Murray | H04W 52/0232 |

OTHER PUBLICATIONS

5G; NR; Medium Access Control (MAC) protocol specification (3GPP TS 38.321 version 15.8.0 Release 15); ETSI TS 138 321 V15.8.0; Jan. 2020.

5G; NR; Medium Access Control (MAC) protocol specification (3GPP TS 38.321 version 16.4.0 Release 16); ETSI TS 138 321 V16.4.0; Apr. 2021.

How LTE Stuff Works ?; http://howltestuffworks.blogspot.com/2014/06/connected-mode-drx.html; Aug. 5, 2014.

A Technical look at 5G mobile device energy efficiency; 3. https://www.ericsson.com/en/blog/2020/2/mobile-devices-and-energy-efficiency; Feb. 27, 2020.

DRX (Discontinuous Reception) LTE NB-IoT 5G(NR-NSA); 5. https://www.blacktechnoguys.com/2018/11/drx-discontinuous-reception.html; Jan. 15, 2019, Best Available Date: Nov. 2018.

\* cited by examiner

METHOD AND APPARATUS FOR OPTIMAL USER EQUIPMENT (UE) POWER CONSUMPTION IN NEW RADIO (NR) CONNECTED DISCONTINUOUS RECEPTION (C-DRX) MODE

REFERENCE TO RELATED APPLICATIONS

This Application claims the benefit of U.S. Provisional Application No. 63/208,035, filed on Jun. 8, 2021, the contents of which are hereby incorporated by reference in their entirety.

FIELD

The present disclosure relates to the field of wireless communication systems including a system and method for reducing UE power consumption during discontinuous reception (DRX) in connected mode.

BACKGROUND

The power consumption of User Equipment (UE) has always been a serious issue for wireless data transmission. A mobile terminal is supposed to monitor control signals continuously to be able to send and receive actual data. In 5G NR, these control signals are sent on Physical Downlink Control Channel (PDCCH). But monitoring PDCCH becomes a waste of radio resources and battery power particularly in the case when no uplink (UL) or downlink (DL) transmission is scheduled for longer periods. Discontinuous Reception (DRX) is one possible solution to avoid this situation, which means that a UE stays asleep and wakes up only at particular interval of times to monitor PDCCH for any data transfer.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
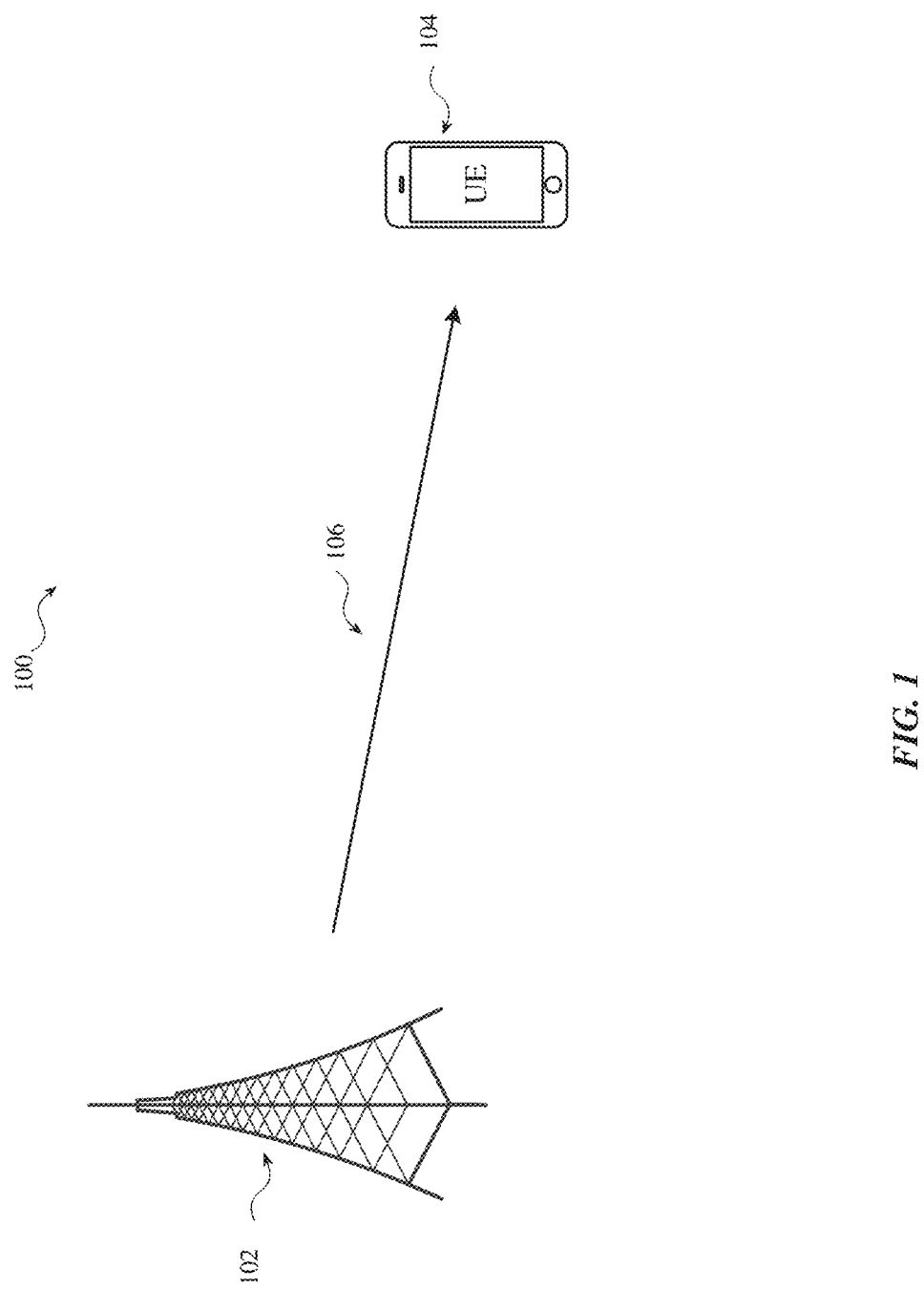
FIG. 1 illustrates a simplified block diagram of a wireless communication system 100, according to one aspect of the disclosure.

In one aspect of the disclosure, a user equipment (UE) configured for discontinuous reception (DRX) operation is disclosed. The UE comprises one or more processors configured to perform a static DRX update by aggregating all DRX timers configured for the UE during each slot of one or more consecutive slots associated with a radio frame structure, until it is determined that all the DRX timers are expiring in a select slot of the one or more consecutive slots. The one or more processors are further configured to compute an end of DRX active time based on an end time of one or more DRX timers of all the DRX timers, upon performing the static DRX update in the select slot, and perform a dynamic DRX event aggregation responsive to determining that all DRX events associated with physical downlink control channel (PDCCH) monitoring occasions (MOs) within the computed end of DRX active time have not been received.

In one aspect of the disclosure, a baseband (BB) processor for a user equipment (UE) configured for discontinuous reception (DRX) operation is disclosed. The BB processor is configured to perform operations comprising performing a static DRX update by aggregating all DRX timers configured for the UE during each slot of one or more consecutive slots associated with a radio frame structure, until it is determined that all the DRX timers are expiring in a select slot of the one or more consecutive slots. The operations further comprise computing an end of DRX active time based on an end time of one or more DRX timers of all the DRX timers, upon performing the static DRX update in the select slot; and detecting a DRX gap responsive to determining that all DRX events associated with physical downlink control channel (PDCCH) monitoring occasions (MOs) within the computed end of DRX active time have been received.

In one aspect of the disclosure, a method for a user equipment (UE) configured for discontinuous reception (DRX) operation is disclosed. The method comprises performing a static DRX update, using one or more processors, by aggregating all DRX timers configured for the UE during each slot of one or more consecutive slots associated with a radio frame structure, until it is determined that all the DRX timers are expiring in a select slot of the one or more consecutive slots. The method further comprises computing an end of DRX active time, using the one or more processors, based on an end time of one or more DRX timers of all the DRX timers, upon performing the static DRX update in the select slot; and performing a dynamic DRX event aggregation, using the one or more processors, responsive to determining that all DRX events associated with physical downlink control channel (PDCCH) monitoring occasions (MOs) within the computed end of DRX active time have not been received. In addition, the method comprises detecting a DRX gap, using the one or more processors, responsive to determining that all the DRX events associated with the PDCCH MOs within the computed end of DRX active time have been received.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects. However, it will be apparent to those skilled in the art having the benefit of the present disclosure that the various aspects may be practiced in other examples that depart from these specific details. In certain instances, descriptions of well-known devices, circuits, and methods are omitted so as not to obscure the description of the various aspects with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As indicated above, Discontinuous reception (DRX) is a method to reduce UE power consumption. In particular, Discontinuous reception (DRX) operation in connected mode is aimed to reduce the UE power consumption when there are sparse downlink (DL) assignments and uplink (UL) grants, by allowing the UE to go to sleep (when the PDCCH is not monitored) during a DRX gap (i.e., DRX inactive time). In the aspects throughout the disclosure, the term DRX operation also refers to DRX operation in connected mode or C-DRX. In some aspects, the DRX operation is enabled at the UE based on processing a DRX configuration signal that is received from the network (or a base station). In some aspects, the DRX configuration signal comprises an information element IE DRX-Config. In some aspects, the IE DRX-Config is received at the UE as part of a dedicated radio resource control (RRC) configuration signal from the network (or the base station). In other words, the DRX configuration signal comprises an RRC configuration signal. In some aspects, the IE DRX-Config includes the following DRX parameters:

DRX Cycle Information:
    These include long cycle, short cycle, short cycle timer (if short cycle is configured) and slot offsets, which define the DRX Cycle length (either short cycle or long cycle) and the start of each DRX cycle (or the start of the on-Duration of each DRX cycle). In some aspects, the DRX cycle comprises a duration of time that is periodically repeated.

DRX on-Duration Timer:
    This timer specifies the number of consecutive PDCCH symbols/subframes the UE monitors at the beginning of each DRX cycle.

DRX Inactivity Timer:
    This timer specifies the duration after the PDCCH occasion in which a PDCCH indicates a new uplink (UL) or downlink (DL) transmission for the medium access control (MAC) entity.

DL hybrid automatic repeat request (HARQ) round trip time (RTT) timer and DL HARQ Retransmission Timer:

These are DL HARQ process specific timers. The DL HARQ RTT timer specifies the round trip time after the end of UL transmission (physical uplink control channel (PUCCH) or physical uplink shared channel (PUSCH)) carrying the HARQ feedback for the corresponding HARQ process and the DL HARQ retransmission timer specifies the time after the DL HARQ RTT timer has expired, during which the network (or base station) can send a retransmission for a HARQ process which was not successfully decoded.

UL HARQ RTT timer and UL HARQ Retransmission Timer:

These are UL HARQ process specific timers. The UL HARQ RTT timer specifies the round trip time after the end of UL transmission (PUSCH) of the corresponding HARQ process and the UL HARQ retransmission timer specifies the time after the UL HARQ RTT timer has expired, during which the network (or the base station) can send a retransmission UL grant.

In some aspects, the IE DRX-Config may further include one or more DRX parameters in addition to the above listed parameters. Upon processing the above DRX parameters, the UE is configured with the above DRX parameters. Once the UE is configured with the above DRX parameters, the UE is further configured to perform DRX operation based on the above DRX parameters. In particular, the UE is configured to derive a DRX active time, which is the time during which UE must monitor the PDCCH occasions, based on the above DRX parameters. When the UE is outside of DRX active time, UE is not required to monitor PDCCH and can go to sleep provided all the activities scheduled within the DRX active time are finished. In some aspects, the time period outside of the DRX active time where the UE can go to sleep is referred to as the DRX inactivity time or DRX gap.

To achieve efficient DRX operation that saves UE power, the following requirements need to be satisfied:

Not cause additional overhead in terms of computational complexity at the UE (that leads to increased central processing unit (CPU) millions of instructions per second (MIPS) utilization) to identify/detect DRX gaps.

Detect the DRX gap at the UE at the earliest possible occasion.

In some aspects, detecting the DRX gap at a specific time/occasion refers to starting the DRX gap at the specific time/occasion. In other words, the UE goes to sleep at the specific time/occasion. In order to detect/identify the DRX gaps, in some aspects, the UE needs an aggregation of all DRX timers configured for the UE. In some aspects, all the DRX timers referred herein comprises all the timers configured by the IE DRX-Config, for example, the DRX on-duration timer, the DRX inactivity timer etc. In some aspects, the aggregation of all the DRX timers includes determining an end time of all the DRX timers. In some aspects, the DRX gap can be detected only when it is determined that all the DRX timers configured for the UE are expired or not running, and therefore, it is essential to know the end time of all the DRX timers. Some of the DRX timers are periodic, for example, the DRX on-duration timer that starts with the start of each DRX cycle and ends after its specified period (as configured by the IE DRX-Config). However, in some aspects, the periodic DRX timers ends based on certain conditions, for example, based on one or more DRX events received at the UE (from the base station) or based on one or more DRX events triggered by the UE. In some aspects, the DRX events comprise events or signaling (e.g., downlink control information (DCI), UL scheduling information etc.) that affects the start time or stop time (or end time) of one or more DRX timers. Further, some other DRX timers are non-periodic, for example, the DRX inactivity timer, DL HARQ RTT timer etc. Such non-periodic timers start based on certain conditions, for example, based on one or more DRX events received at the UE (from the base station) or based on one or more DRX events triggered by the UE. Further, such non-periodic timers stop or end after a specified period (as configured by the IE DRX-Config) after its start time or based on certain conditions, for example, based on one or more DRX events received at the UE (from the base station) or based on one or more DRX events triggered by the UE. Therefore, in some aspects, the end time of one or more of the DRX timers configured for the UE are dictated by (or derived based on) the various DRX events received at/triggered by the UE.

Following are some of the DRX events that triggers (starts or stops) one or more of the DRX timers configured for the UE:

DCI information for formats 0 and 1 received from the base station (e.g., from a Control Channel Processor)—This DRX event starts the DRX inactivity timer and stops the corresponding DL HARQ/UL HARQ retransmission timers, if running.

DL cyclic redundancy check (CRC) for each DL transport block (TB) signaled on C-RNTI received from the base station (e.g., from a Shared channel processor)—This DRX event enables the start of the DL HARQ retransmission timer.

Uplink scheduling information received from the base station (e.g., from a UL scheduler)—This DRX event starts UL/DL HARQ RTT timers.

Configured DL assignment information received from the base station (e.g., from a DL semi-persistent scheduling (SPS) scheduler)—This DRX event stops the corresponding DL HARQ retransmission timer, if running.

Configured UL grant information received from the base station (e.g., from a configured UL scheduler)—This DRX event stops the corresponding UL HARQ retransmission timer, if running.

Medium access control (MAC) control element (CE) information received from the base station (e.g., from a MAC CE parser)—This DRX event stops the DRX on-duration/DRX inactivity timers and enter either long DRX cycle or normal DRX cycle.

Pending scheduling request (SR) triggered from the UE (e.g., from a SR scheduler)—This DRX event triggers the UE to enter continuous reception mode. The continuous reception mode overrides any DRX timers if running and prevents UE from going to sleep.

Ongoing Random access after successful reception of Random Access Response (RAR) at the UE from the base station (e.g., from a RA controller)—This DRX event triggers the UE to enter continuous reception mode.

Ideally, in order to detect/start a DRX gap at the earliest possible opportunity/occasion, DRX timer aggregation (or determining an end time of all the DRX timers configured for the UE) needs to be done after each and every DRX event received at/triggered by the UE, as each DRX event may affect the DRX timers. However, as the number of such DRX events can potentially be huge, performing a DRX timer aggregation for each and every single DRX event is not optimal as it increases the computational complexity resulting in increased power consumption due to the increase in central processing unit (CPU) load. Moreover, when the UE is in its DRX active time and not close to a DRX gap, there is no benefit in doing the DRX timer aggregation based on every single DRX event. On the contrary, if the DRX timer aggregation is done at a reduced frequency (say once a slot or subframe) and not based on every DRX event, it would lead to not detecting the DRX gap at the earliest possible opportunity and results in UE being in active period (i.e., actively monitoring the PDCCH) for longer than required, which again results in increase in the UE power consumption. One example of huge number of DRX events is downlink control information (DCI) based DRX events. For new radio (NR), there can be up to 18 possible PDCCH monitoring occasions (MO) in one slot for one carrier and if one DCI is signaled for each of these monitoring occasions, it would result in 18 DRX events per carrier per slot. Considering carrier aggregation, this number would scale up based on the number of active carriers e.g., 10 active carriers could result in a worst case of 180 DCI based DRX events per slot. In some aspects, the PDCCH MOs comprise a symbol or group of symbols during which a UE is expected to receive a DRX event (e.g., a DCI) from the base station.

Keeping in view these issues, disclosed herein are systems, circuitries, and techniques for allowing the UE to efficiently determine/detect the DRX gap at an optimal UE power consumption. In particular, the present disclosure discloses a system and a method for a UE to detect the DRX gap based on performing DRX timer aggregation only once per slot and monitoring every DRX event only when it is determined that all the DRX timers are going to expire in a particular slot based on the DRX aggregation, further details are given in aspects below. Since the DRX timer aggregation is done only once per slot and not for every DRX event, the proposed method greatly reduces the computational complexity. Further, monitoring every DRX event as soon as it is determined that all the DRX timers are going to expire in a particular slot (or when closer to a DRX gap) enables the UE to determine the DRX gap at a reasonably early opportunity without considerably increasing the computational complexity.

FIG. 1 illustrates a simplified block diagram of a wireless communication system 100, according to one aspect of the disclosure. The wireless communication system 100 comprises a base station (BS) 102 and a user equipment (UE) 104. In other aspects, however, the wireless communication system 100 can comprise a plurality of UEs and is not shown here for clarity purposes. In some aspects, the wireless communication system 100 comprises a new radio (NR) communication system. However, in other aspects, the wireless communication system 100 may be associated with other wireless communication technologies, for example, LTE or any future wireless communication technologies. In some aspects, base station 102 is equivalent to an eNodeB in LTE systems, gNodeB in 5G new radio (NR) systems etc. or any base station associated with future wireless communication technologies. In some aspects, the UE 104 may comprise a mobile phone, tablet computer, an internet of things (IoT) device, a vehicle-to-everything (V2X) UE, etc. The base station 102 and the UE 104 are configured to communicate with one another over a communication medium (e.g., air). In some aspects, the wireless communication system 100 supports multiple numerologies (15 KHz, 30 KHz, 60 KHz and 120 KHz) both within a carrier (due to different uplink/downlink bandwidth parts (BWPs)) as well as across carriers (carrier aggregation). In some aspects, the UE 104 is configured to perform discontinuous reception (DRX) operation in a connected mode, as can be fully appreciated below.

In some aspects, the BS 102 is configured to provide a DRX configuration signal 106 to the UE 104. In some aspects, the DRX configuration signal 106 comprises a plurality of DRX parameters, for example, DRX Cycle Information, DRX on-duration timer etc. as explained above. In some aspects, the DRX configuration signal 106 includes an information element IE DRX-Config that comprises the plurality of DRX parameters. In some aspects, the DRX configuration signal 106 is provided as part of a dedicated radio resource control (RRC) configuration signal. Upon receiving the DRX configuration signal 106, the UE 104 is configured to process the DRX configuration signal 106. Upon processing the DRX configuration signal 106, the UE 104 is configured with the DRX parameters, thereby enabling the UE 104 to perform DRX operation in the connected mode.

In some aspects, the UE 104 comprises a plurality of DRX timers associated therewith. In some aspects, the plurality of DRX timers is configured by the DRX configuration signal 106 (based on the DRX parameters included therewith). In some aspects, at least a set of the DRX timers of the plurality of DRX timers of the UE 104 are started or stopped based on one or more DRX events, for example, DCI, DL CRC etc. as explained above. In some aspects, the set of DRX timers may be started or stopped based on DRX events associated with one or more component carriers (CC). In some aspects, the DRX events comprise events or signaling that affects the start time or stop time (i.e., end time) of one or more DRX timers associated with the UE 104. In some aspects, the DRX events may include signaling that is received at the UE 104 from the BS 102. Alternately, in some aspects, the DRX events may include signaling that is provided by the UE 104 to the BS 102.

Figure 2:
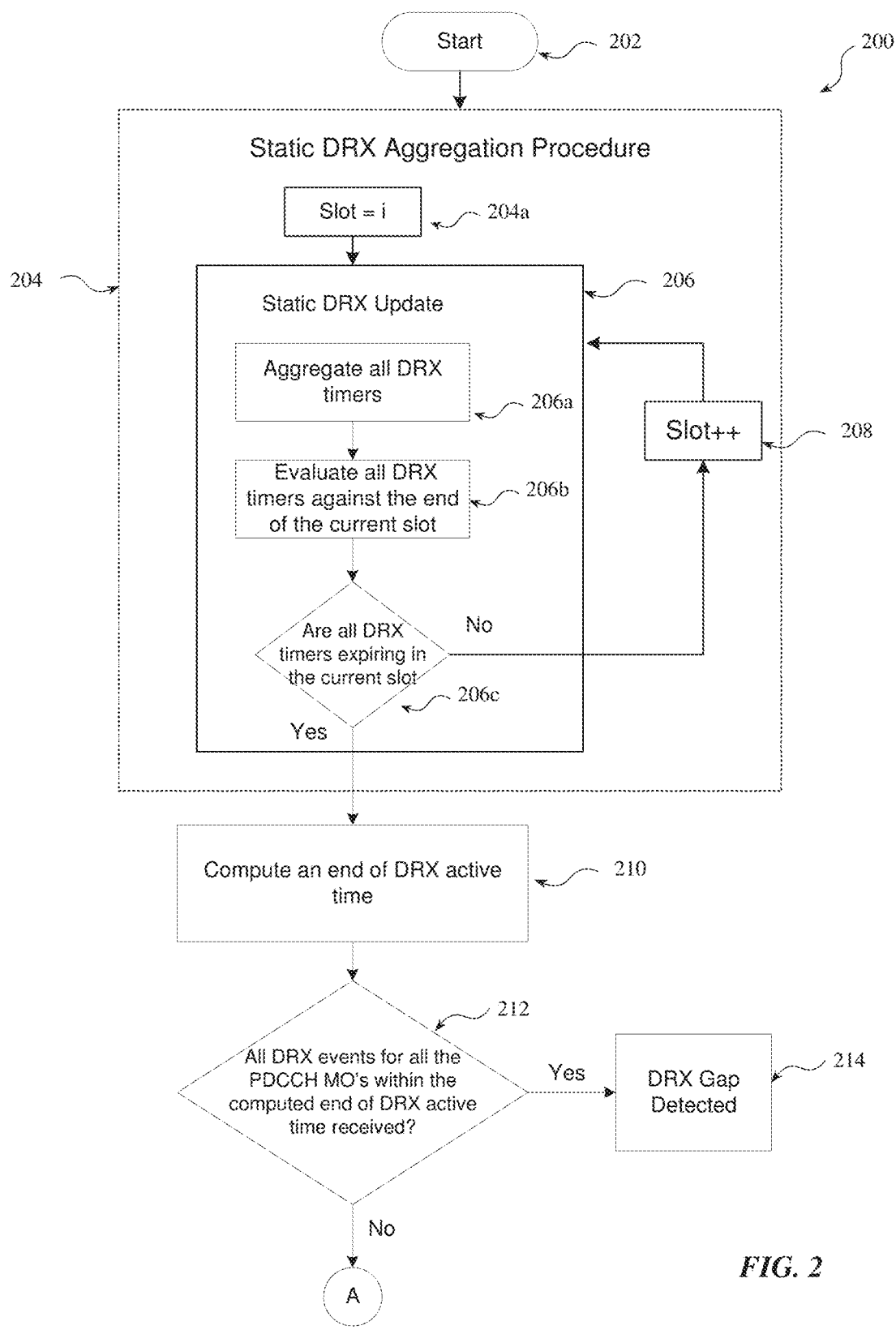
FIG. 2 illustrates a DRX gap detection algorithm, according to one aspect of the disclosure.
Figure 2:
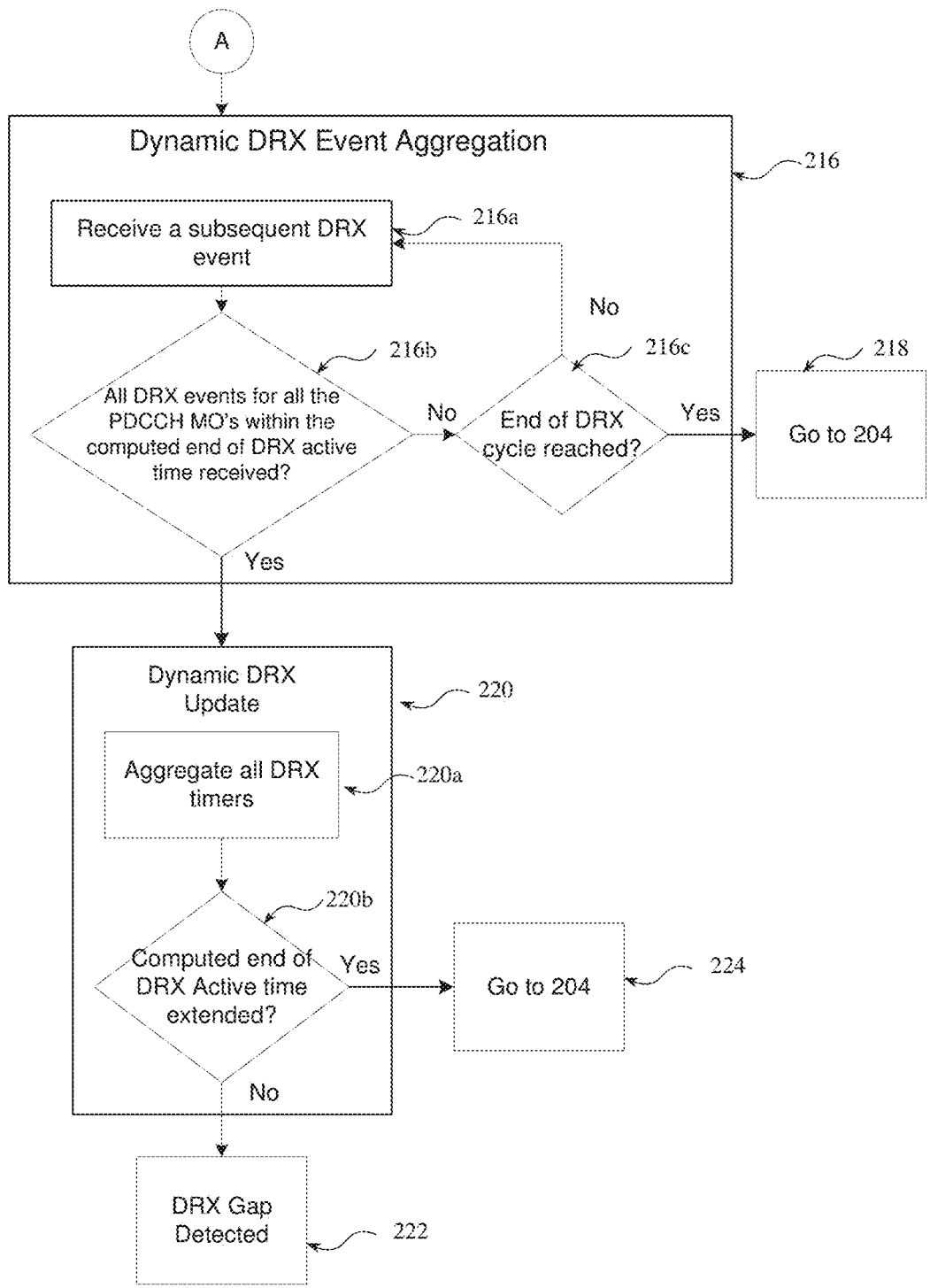

During the DRX operation, the UE 104 is configured to monitor physical downlink control channel (PDCCH) during an active period and go to sleep (when the PDCCH is not monitored) during a DRX gap or DRX inactivity time. In some aspects, the UE 104 is configured to monitor the PDCCH from the beginning of a DRX cycle configured for the UE 104 until the DRX gap is detected. More specifically, the UE 104 is configured to monitor the PDCCH at the beginning of every DRX cycle (configured based on the DRX parameters in the DRX configuration signal 106), and go to sleep as soon as the DRX gap is detected within the respective DRX cycle. In some aspects, a DRX gap is detected by the UE 104 based on determining an end time of all the DRX timers configured for the UE. In some aspects, it is essential for the UE 104 to detect the DRX gap at an earliest possible opportunity (or time), in order to avoid the UE 104 being in the active period for longer than required, thereby enabling to reduce the UE power consumption. In order to efficiently detect the DRX gap (at the earliest possible opportunity), in some aspects, the UE 104 is configured to perform a DRX gap detection algorithm 200, as illustrated in FIG. 2. The DRX gap detection algorithm 200 may be performed by any UE that is configured for DRX operation in connected mode, in other aspects.

At 202, the algorithm 200 starts. At 204, a static DRX aggregation procedure is performed. As part of the static DRX aggregation procedure, a slot i associated with a radio frame structure is chosen at 204a. In some aspects, the slot i may comprise a slot that comes immediately after the time the UE 104 is configured with the DRX parameters (or immediately after processing the DRX parameters within the IE DRX-Config). Alternately, in other aspects, the slot i may comprise any slot that the UE 104 is configured to monitor. Once the slot i is chosen at 204*a*, a static DRX update is performed at 206, as part of the static DRX aggregation procedure. In some aspects, the static DRX update at 206 is performed at a predefined static DRX update time (i.e., a fixed time) associated with the slot i (that forms a current slot in a first iteration of the static DRX aggregation procedure 204). In some aspects, the predefined static DRX update time may comprise a period of time or time period, for example, a symbol. As part of the static DRX update, all the DRX timers configured for the UE 104 are aggregated at 206*a*. In some aspects, aggregating all the DRX timers comprise determining an end time of all the DRX timers configured for the UE 104. Further, all the aggregated DRX timers at 206*a* (or the end time of all the DRX timers determined at 206*a*) are evaluated against an end of the current slot (e.g., against the end of the last symbol of the current slot) at 206*b*, as part of the static DRX update. Furthermore, a determination whether all the aggregated DRX timers are going to expire in the current slot (i.e., before the end of the slot) is made at 206*c* (based on the evaluation at 206*b*), as part of the static DRX update. In some aspects, all the aggregated DRX timers are determined to expire in the current slot (at 206*c*) when the end time of all the aggregated DRX timers is within the end of the current slot. Once the determination at 206*c* is made, the static DRX update in the current slot ends, and the algorithm 200 proceeds to 208 or 210 based on the determination at 206*c*.

In particular, if it is determined that the all the DRX timers are not going to expire in the current slot (i.e., NO at 206*c*), the algorithm 200 proceeds to 208 where the slot i is incremented to a next consecutive slot (which forms the current slot in a next iteration). Further, the algorithm 200 proceeds to 206, where the static DRX update at 206 is repeated at the predefined static DRX update time in the next consecutive slot. At 206*c*, when it is determined that all the DRX timers are expired or going to expire in the current slot (i.e., YES at 206*c*), the algorithm 200 proceeds to 210, thereby ending the static DRX aggregation procedure. In some aspects, the current slot may comprise the slot i chosen for the first iteration of the static DRX aggregation procedure 204 or any of the consecutive slots chosen (e.g., at 208) for any of the subsequent iterations of the static DRX aggregation procedure 204. For ease of reference, the current slot (of the first iteration of the static DRX aggregation procedure 204 or of any of the subsequent iterations) where all the DRX timers are expiring is referred to herein as a select slot. Therefore, during the static DRX aggregation procedure 204, the static DRX update at 206 is performed in each slot of one or more consecutive slots, until it is determined, by the UE 104, that all the DRX timers are expiring in a select slot of the one or more consecutive slots. In some aspects, the UE 104 is configured to determine that all the DRX timers are expiring in the select slot of the one or more consecutive slots, based on (or as part of) the static DRX update (in particular, the determination at 206*c*) performed in the select slot (specifically, during the static DRX update performed in the select slot). In some aspects, the static DRX update at 206 is performed at the predefined static DRX update time (e.g., at a fixed time) within each of the one or more consecutive slots. In some aspects, the static DRX update at 206 is performed only once (i.e., at the predefined static DRX update time) within each of the one or more consecutive slots.

Figure 3:
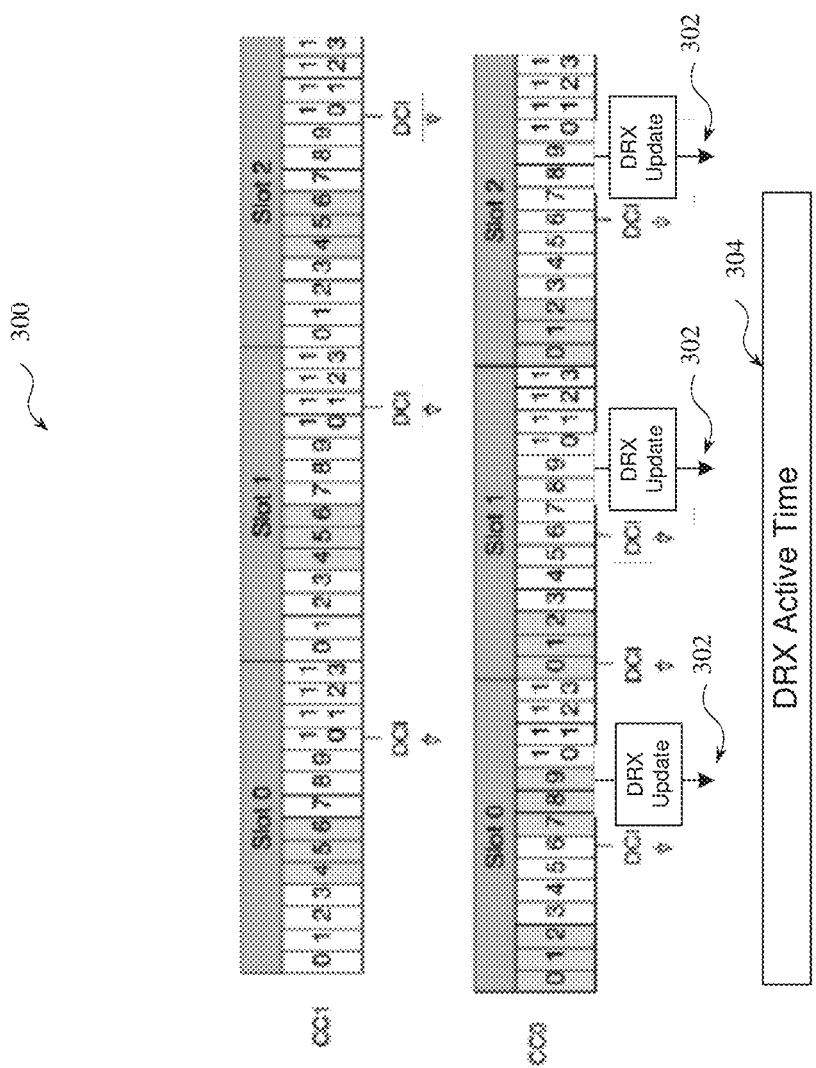
FIG. 3 illustrates an example implementation of a static DRX aggregation procedure, where a static DRX update is performed in 3 consecutive slots, slot 0, slot 1, and slot 2, according to one aspect of the disclosure.

FIG. 3 illustrates an example implementation of a static DRX aggregation procedure 300, where a static DRX update 302 is performed in 3 consecutive slots, in particular from slot 0 until slot 2. In particular, the static DRX update 302 is performed in symbol 9 (which forms the predefined static DRX update time) associated with the component carrier, CC0 of each of the 3 slots. In this aspect, it is assumed that all the DRX timers expire in slot 2, and therefore the static DRX update is performed until slot 2, thereby ending the static DRX aggregation procedure 300 at slot 2. In some aspects, the determination that all the DRX timers are expiring in slot 2 is made based on (or as part of) the static DRX update 302 in slot 2. In other aspects, if all the DRX timers are not expiring in slot 2, the static DRX update 302 may proceed in one or more subsequent slots beyond slot 2 until a select slot (e.g., until a slot 6, which is not illustrated herein) where all the DRX timers are expiring is determined by the UE 104, based on the static DRX update performed in the select slot (i.e., in slot 6). Further, in some aspects, if all the DRX timers are determined to expire in slot 0, the static DRX update 302 may be performed only in slot 0.

Referring back to the algorithm 200, when the static DRX aggregation procedure at 204 ends (i.e., Yes at 206*c*), the algorithm proceeds to 210. At 210, an end of DRX active time is computed. In some aspects, the end of the DRX active time is computed upon performing the static DRX update in the select slot, in particular, at a time instance immediately after the time of the static DRX update in the select slot. In some aspects, the end of the DRX active time is computed with a time period (e.g., a symbol) defined by the predefined static DRX update time associated with the select slot when the static DRX update is performed in the select slot. For example, in some aspects, if the predefined static DRX update time comprises symbol 9, then the static DRX update at 206 and the computation of the end of the DRX active time at 210 may be performed within the symbol 9. In some aspects, the end of the DRX active time is determined based on an end time of one or more of all the DRX timers configured for the UE 104. In particular, in some aspects, the end of the DRX active time is determined to be equal to the end time of the DRX timer whose end time is the greatest (or the last) among the one or more DRX timers. Therefore, the end of the DRX active time will be within the select slot, where all the DRX timers are determined as expiring. In some aspects, the end of DRX active time may be before the time of the static DRX update within the select slot (e.g., the end of the DRX active time 304 in FIG. 3 is determined to be at the end of symbol 7 of slot 2 of CC0 which is before symbol 9 of slot 2 where the static DRX update 302 is performed). Alternately, in other aspects, the end of the DRX active time may be after the time of the static DRX update within the select slot.

Figure 4:
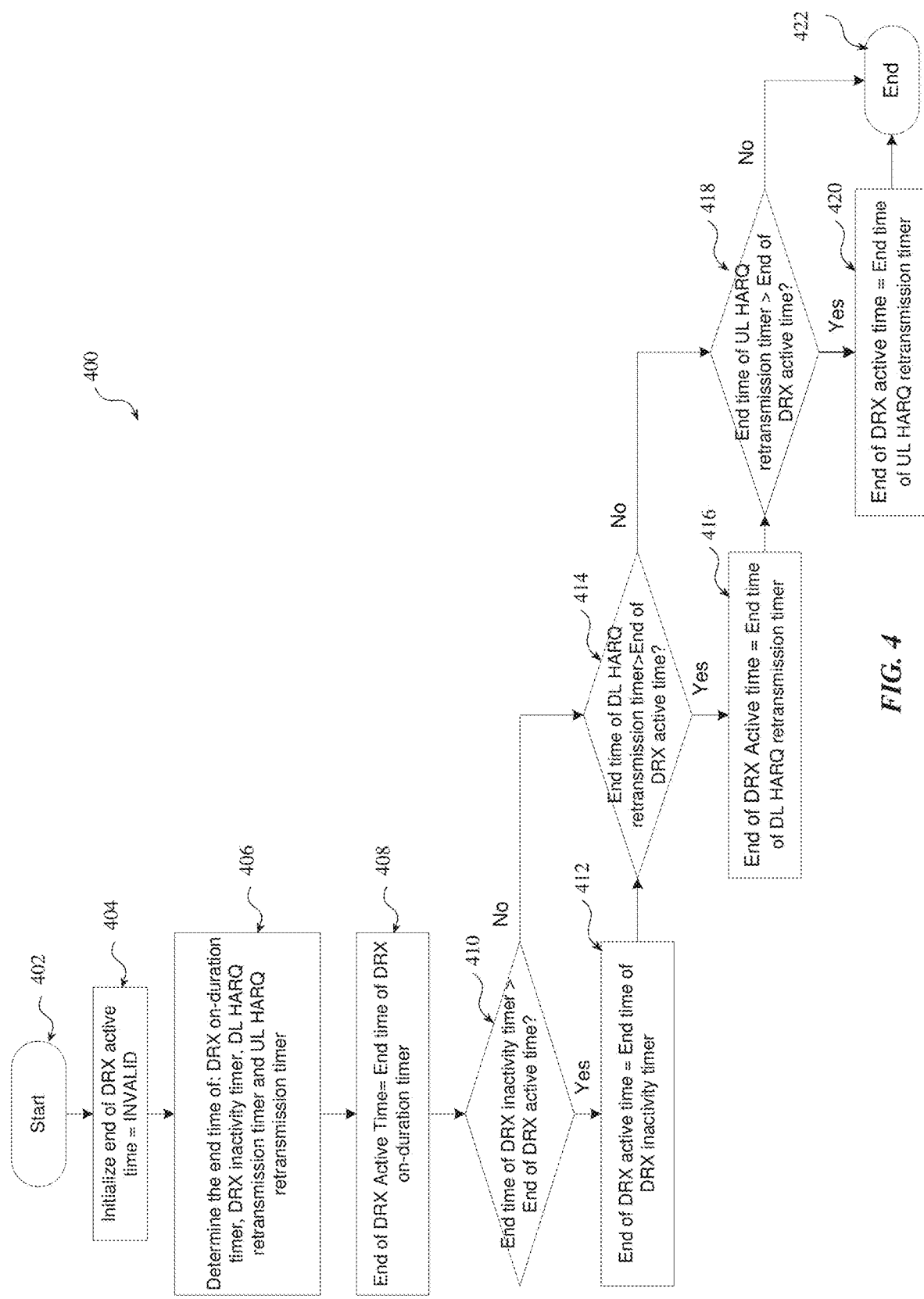
FIG. 4 illustrates an exemplary DRX active time determination algorithm for determining the end of DRX active time, according to one aspect of the disclosure.

FIG. 4 illustrates an exemplary DRX active time determination algorithm 400 for determining the end of DRX active time, according to one aspect of the disclosure. In some aspects, the end of the DRX active time is determined based on an end time of all the DRX timers configured for the UE. However, in other aspects, the end of the DRX active time may be determined based on an end time of one or more DRX timers of all the DRX timers configured for the UE. In the algorithm 400, the end of DRX active time is determined/computed based on the end time of the DRX on-duration timer, the end time of the DRX inactivity timer, the end time of the DL HARQ retransmission timer and the end time of the UL HARQ retransmission timer. However, the end of DRX active time may be determined differently (e.g., using more or less DRX timers), in other aspects. In some aspects, the DRX active time determination algorithm 400 may be performed by the UE 104, in order to determine the end of DRX active time at 210 of the algorithm 200.

At 402, the algorithm 400 starts. At 404, the end of the DRX active time is initialized to an INVALID value. At 406, the end times of the DRX on-duration timer, the DRX inactivity timer, the DL HARQ retransmission timer and the UL HARQ retransmission timer are determined. At 408, the end of DRX active time is set to be equal to the end time of the DRX on-duration timer. At 410, a determination whether the end time of the DRX inactivity timer is greater than the end of the DRX active time is made. If No at 410, the algorithm 400 proceeds to 414, where a determination whether the end time of the DL HARQ retransmission timer is greater than the end of the DRX active time is made. If yes at 410, the algorithm 400 proceeds to 412, where the end of the DRX active time is set to be equal to the end of the DRX inactivity timer. Then, the algorithm 400 subsequently proceeds to 414. If No at 414, the algorithm 400 proceeds to 418, where a determination whether the end time of the UL HARQ retransmission timer is greater than the end of the DRX active time is made. If Yes at 414, the algorithm 400 proceeds to 416, where the end of the DRX active time is set to be equal to the end time of the DL HARQ retransmission timer. Then the algorithm 400 subsequently proceeds to 418. If yes at 418, the algorithm 400 proceeds to 420 where the end of the DRX active time is set to be equal to the end time of the UL HARQ retransmission timer and then the algorithm ends at 422. If No at 418, the algorithm ends at 422. It is hereby noted that any reference to the DL/UL HARQ retransmission timer would refer to an aggregation of all running DL/UL HARQ transmission timers and not necessarily a single DL/UL HARQ retransmission timer.

Referring back to the algorithm 200 in FIG. 2, once the end of the DRX active time is computed at 210, the algorithm proceeds to 212, where a determination whether all the DRX events (e.g., DCI) associated with all the PDCCH monitoring occasions (associated with all numerologies or component carriers) within the computed end of DRX active time (at 210) are received, is made. In some aspects, the determination at 212 is performed upon computing the end of the DRX active time at 210, in particular, at a time instance immediately after the computation at 210. In some aspects, the computation at 212 is performed within a time period (e.g., a symbol) defined by the predefined static DRX update time in the select slot when the static DRX update is performed in the select slot. For example, in some aspects, if the predefined static DRX update time comprises symbol 9, then the static DRX update at 206, the computation of the end of the DRX active time at 210 and the determination at 212 may be performed within the symbol 9 or at symbol 9. In order to determine whether all the DRX events associated with all the PDCCH monitoring occasions within the computed end of DRX active time (as per 210) are received (in other words, in order to implement the determination at 212), a knowledge of all the PDCCH MOs within the DRX active time and the DRX events associated therewith is required at the UE 104. In some aspects, a bitmap of all symbols in a subframe (with respect to a common time base among all numerologies or component carriers) is defined by the UE 104, to track the various PDCCH MO's and whether the DRX events associated with the PDCCH MOs are received.

Figure 5:
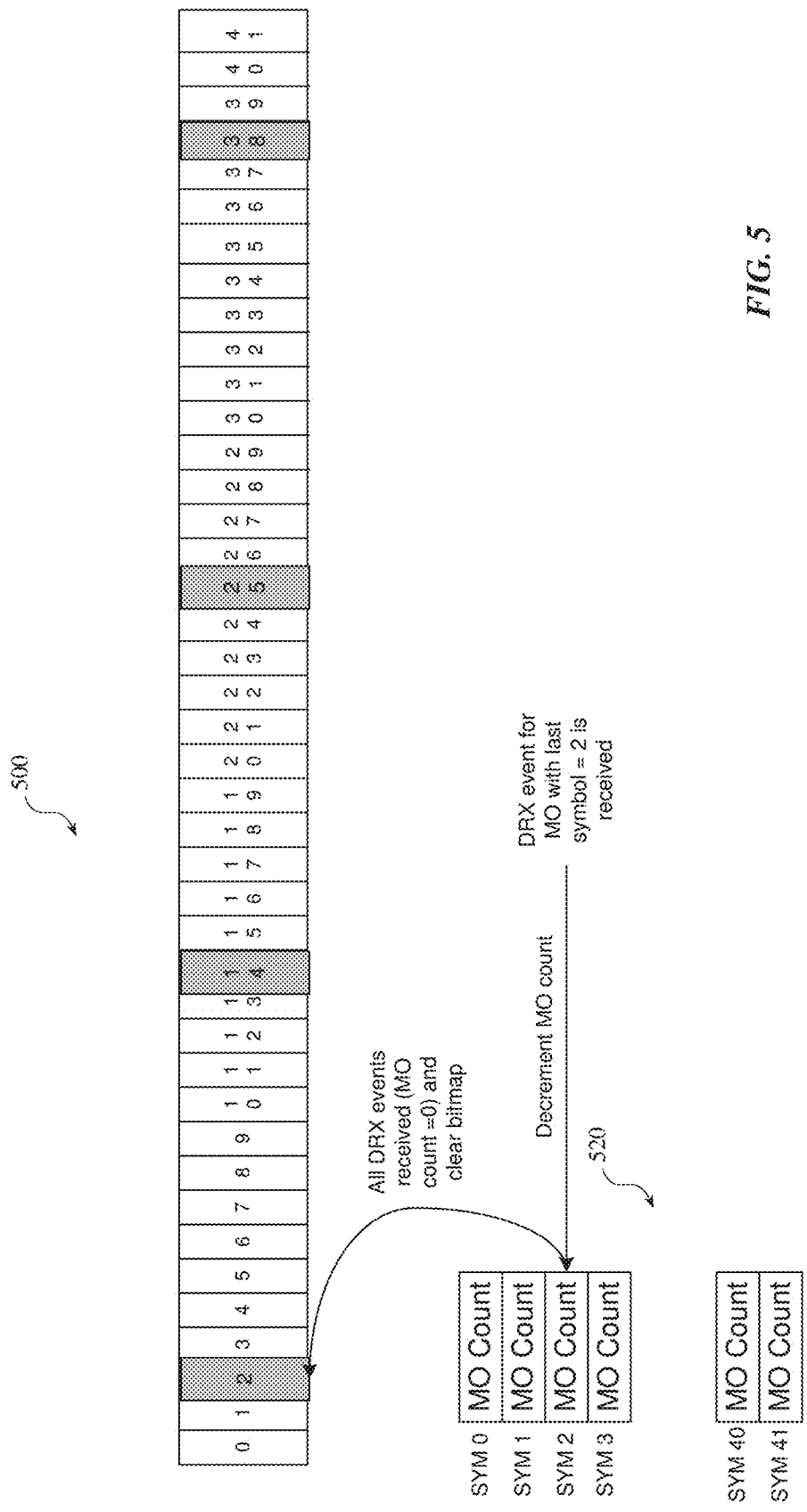
FIG. 5 illustrates an exemplary physical downlink control channel (PDCCH) monitoring occasion (MO) bitmap, according to one aspect of the disclosure.

FIG. 5 illustrates an exemplary PDCCH MO bitmap 500, according to one aspect of the disclosure. In some aspects, the determination at 212 may be performed at the UE 104 based on the bitmap 500. The bitmap 500 comprises/defines all the symbols in a subframe with respect to a common time base among all numerologies (however, only a part of the subframe is illustrated as part of the bitmap 500 in FIG. 5 for clarity, and the number of symbols associated with the subframe may be different than depicted (e.g., can have 112 symbols within the subframe)). In some aspects, the bitmap 500 is stored in a memory circuit within the UE 104. During the scheduling of the PDCCH reception, the last symbol of each PDCCH MO within the subframe is set (e.g., to 1) in the bitmap 500. In some aspects, the information of the last symbol of each of the PDCCH MOs is provided to the UE 104 from the BS 102, during PDCCH scheduling. In the bitmap 500, the symbols 2, 14, 25 and 38 constitutes the last symbols of the various PDCCH monitoring occasions (MO's) across all numerologies or component carriers within a subframe. In some aspects, the last symbol is reset or cleared (e.g., to 0) when the DRX event corresponding to the PDCCH MO is received at the UE 104. In some aspects, if the last symbol of a PDCCH MO in the bitmap 500 lies within the computed end of DRX active time (computed at 210 in the algorithm 200) for the UE 104, the UE checks the bitmap 500 to see if the last symbol is set or reset, to track whether the DCI (or DRX event) for the PDCCH MO is received or not. When the last symbol of a PDCCH MO is set, the UE determines that the DRX event associated with the corresponding PDCCH MO is not yet received at the UE 104. Further, when the last symbol of the PDCCH MO is reset, the UE 104 determines that the DRX event associated with the corresponding PDCCH MO is received at the UE 104.

In some aspects, the UE 104 is configured to reset (or clear) the last symbol of the PDCCH MOs in the bitmap 500, based on information of the PDCCH MOs that is stored in an MO count table 520 (e.g., stored in a memory circuit associated with the UE 104). In some aspects, the MO count table 520 comprises a plurality of entries, each entry corresponding to a MO count for a specific symbol. In some aspects, the information of a number of PDCCH MOs that ends in a specific symbol (or count of the PDCCH MOs that ends in a specific symbol) is stored as the MO count associated with the specific symbol in the MO count table 520. In some aspects, the information of the number of PDCCH MOs that ends in a specific symbol is provided to the UE 104 from the BS 102, during PDCCH scheduling. More specifically, the entries (or the MO counts associated with each symbol) of the MO count table 520 are populated based on information provided by the BS 102. In some aspects, multiple PDCCH MOs (for example, associated with different component carriers) can have the same last symbol, for example SYM 2. For example, if there are 2 PDCCH MOs having the last symbol in symbol 2, then the MO count corresponding to SYM 2 in the MO count table 520 is set to 2. In some aspects, each PDCCH MO has a corresponding DRX event associated therewith. Each time a DRX event associated with a PDCCH MO that ends in a specific symbol (for example, SYM 2) is received, the MO count associated with the corresponding symbol in the MO count table 520 is reduced (to the next lesser number) by the UE 104. When all the DRX events associated with all the PDCCH MO that ends in the specific symbol (e.g., SYM 2) are received, MO count in SYM 2 will be reduced to 0 and then the corresponding bit in the bitmap 500 is reset (or cleared). A ping-pong bitmap may be needed one for even subframe and other for odd subframe in order to handle cases where DRX event of one subframe is received in the next. In some embodiments, the MO bitmap and the MO count could be computed once every subframe for all the slots in that subframe. In order to ensure that the computed MO bitmap and the MO count for each subframe are not overwritten by the ones computed in the next subframe, ping pong buffers of the same can be maintained.

Referring back to the algorithm 200 in FIG. 2, if all the DRX events (e.g., DCI) associated with all the PDCCH monitoring occasions within the computed end of DRX active time (at 210) are determined to be received at 212 (i.e., Yes at 212), the algorithm 200 proceeds to 214, where the DRX gap is detected. In some aspects, the DRX gap is detected upon performing the determination at 212, in particular, at a time instance immediately after performing the determination at 212. In some aspects, the DRX gap is detected within a time period (e.g., a symbol) defined by the predefined static DRX update time associated with the select slot when the static DRX update is performed in the select slot. For example, in some aspects, if the predefined static DRX update time comprises symbol 9, then the static DRX update at 206, the computation of the end of the DRX active time at 210, the determination at 212 and the detection of the DRX gap at 214 may be performed within the symbol 9. In some aspects, a start time of the DRX gap coincides with a time the DRX gap is detected. Therefore, in some aspects, the start time of the DRX gap coincides with the predefined static DRX update time associated with the select slot when the static DRX update is performed in the select slot. In some aspects, the DRX gap ends at the end of a corresponding DRX cycle, or earlier based on some triggering conditions. During the DRX gap, the UE 104 goes to sleep (or the PDCCH is not monitored).

Figure 6:
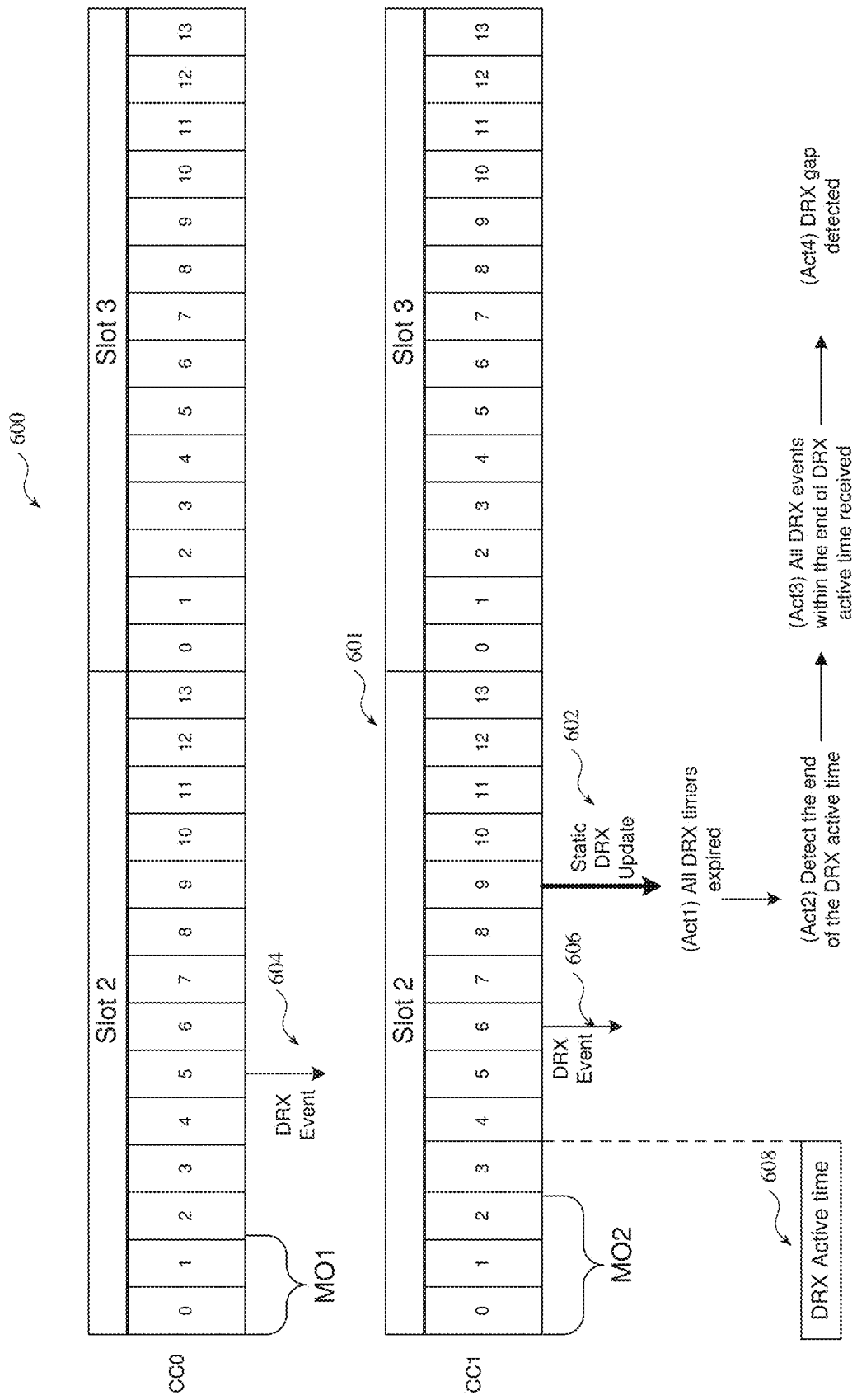
FIG. 6 illustrates an example implementation of a scenario for a static DRX update, where all the DRX events associated with all the PDCCH monitoring occasions (associated with 2 component carriers) within the computed end of DRX active are received at the time of a static DRX update, according to one aspect of the disclosure.

FIG. 6 illustrates an example implementation of a scenario 600 for a static DRX update, where all the DRX events associated with all the PDCCH monitoring occasions (associated with 2 component carriers) within the computed end of DRX active time are received at the time of a static DRX update (corresponding to Yes at 212 in the algorithm 200 of FIG. 2), according to one aspect of the disclosure. In some aspects, the time of the static DRX update corresponds to the predefined static DRX update time (i.e., a fixed time) associated with the corresponding slot. In the scenario 600, a static DRX update 602 (i.e., based on act 206 in the algorithm 200) associated with a static DRX aggregation procedure is performed in symbol 9 (that forms the predefined static DRX update time) of slot 2 of a radio frame 601. For ease of reference, only 2 slots, slot 2 and slot 3 of the radio frame 601 are shown herein. However, the radio frame 601 may comprise other slots. At the time of the static DRX update 602, at a first act, Act 1, it is determined that all the DRX timers are expiring in slot 2 (i.e., based on act 206c of the algorithm 200). In some aspects, the slot 2 in FIG. 6 may correspond to the slot 2 in FIG. 3, where all the DRX timers are determined to expire. Further, at a second act, Act 2, an end of a DRX active time 608 is computed (i.e., based on act 210 of the algorithm 200). The act 2 is performed immediately after the static DRX update or act 1 within the symbol 9 (i.e., the predefined static DRX update time) in slot 2. It can be seen that the DRX active time 608 ends at the end of symbol 3 of slot 2, and that there are two PDCCH monitoring occasions, MO1 and MO2 within the end of the DRX active time.

Furthermore, at a third act, Act 3, a determination that all the DRX events associated with the PDCCH MOs within the computed end of the DRX active time 608, that is DRX event 604 (associated with MO1) and the DRX event 606 (associated with MO2) are received (i.e., based on the act 212 of the algorithm 200) is made by the UE. The act 3 is performed immediately after act 2 within the symbol 9 (i.e., the predefined static DRX update time) in slot 2). At a fourth act, Act 4, the DRX gap is detected (i.e., based on the act 214 of algorithm 200). The act 4 is performed immediately after act 3 within the symbol 9 (i.e., the predefined static DRX update time) in slot 2. In this aspect, the DRX gap starts in symbol 9 in slot 2. In some aspects, the DRX gap ends at the end of a corresponding DRX cycle or earlier than the end of the corresponding DRX cycle, when triggered by certain conditions.

Referring back to algorithm 200, if all the DRX events (e.g., DCI) associated with all the PDCCH monitoring occasions within the computed end of DRX active time (at 210) are not received at 212 (i.e., No at 212), then the DRX gap is not detected. More specifically, the pending DRX events (yet to be received) may affect the DRX timers (e.g., one or more DRX timers may be started or turned on), and therefore, detecting the DRX gap before receiving all the DRX events would lead to an incorrect detection. In some aspects, the incorrect detection of the DRX gap would lead to a mismatch in the DRX state (DRX operation timings) between the BS 102 (or network) and the UE 104. In such aspects, therefore, the algorithm 200 proceeds to 216 where a dynamic DRX event aggregation is performed. During the dynamic DRX event aggregation at 216, a subsequent DRX event (i.e., a DRX event after the time of the determination at 212) is received at 216a. Upon receiving the subsequent DRX event, a determination whether all the DRX events for all the PDCCH MOs within the computed end of DRX active time (at 210) is received is made at 216b. In some aspects, the determination at 216b is made based on the PDCCH MO bitmap 500 in FIG. 5. In some aspects, the determination at 216b is performed immediately after the time (e.g., within the same symbol) when the subsequent DRX event is received at 216a. If yes at 216b, the dynamic DRX event aggregation ends. If No at 216b, the algorithm 200 proceeds to 216c, where a determination whether an end of a corresponding DRX cycle is reached. If yes at 216c, the dynamic DRX event aggregation ends and the algorithm 200 proceeds to 218, where the static DRX aggregation procedure at 204 is performed or repeated from a slot that starts immediately after the end of the DRX cycle.

If No at 216c, the algorithm 200 proceeds to 216a, where a next subsequent DRX event is received. Therefore, during the dynamic DRX event aggregation at 216, one or more subsequent DRX events are received and for each of the one or more subsequent DRX events received, a determination whether all the DRX events associated with all the PDCCH MOs within the computed end of DRX active time are received is made. In some aspects, the one or more subsequent DRX events comprises DRX events that are received at the UE 104 from a time starting immediately after the determination at 212. In some aspects, the dynamic DRX event aggregation is performed until it is determined that all the DRX events associated with all the PDCCH MOs within the computed end of DRX active time are received (Yes at 216b) at the UE, upon receiving a corresponding DRX event of the one or more subsequent DRX events, or until an end of a current DRX cycle is reached (i.e., Yes at 216c), whichever is earlier. In some aspects, all the DRX events associated with all the PDCCH MOs within the computed end of DRX active time are received within one slot from the computed end of DRX active time. Although not shown, in some aspects, the dynamic DRX event aggregation at 216 may not be initiated when an end of a corresponding DRX cycle is reached before receiving a first subsequent DRX event at 216*a*. In such aspects, the algorithm 200 proceeds to perform/repeat the static DRX aggregation procedure (at 204) from a slot that starts immediately after the end of the DRX cycle.

When all the DRX events associated with all the PDCCH MOs within the computed end of DRX active time are determined to be received at the UE during the dynamic DRX event aggregation (i.e., Yes at 216*b*), upon receiving the corresponding DRX event of the one or more subsequent DRX events, the algorithm 200 proceeds to 220, where a dynamic DRX update is performed/triggered. In some aspects, the dynamic DRX update is performed at a time instance immediately after the determination at 216*b* (e.g., within the same symbol the determination at 216*b* is made or within the same symbol the corresponding DRX event is received). During the dynamic DRX update, at 220*a*, an aggregation of all the DRX timers configured for the UE is performed. In some aspects, the aggregation of all the DRX timers refers to determining an end time of the DRX timers. Further, at 220*b*, a determination whether the computed end of DRX active time (at 210) is extended or not is made, as part of the Dynamic DRX update at 220. In some aspects, the computed end of DRX active time (at 210) may get extended when one or more DRX timers configured for the UE is started based on the DRX events received during the dynamic DRX event aggregation at 216. In some aspects, the computed end of DRX active time is determined to be extended at 220*b* when it is determined that all the DRX timers are not expired based on the aggregation of all the DRX timers performed at 220*a*. If the computed end of DRX active time gets extended at the time of the dynamic DRX update at 220 (i.e., yes at 220*b*), then the DRX gap cannot be detected.

In particular, if yes at 220*b*, the algorithm 200 proceeds to 224, where the static DRX aggregation procedure at 204 is performed/repeated from a current slot or a next slot, in order to detect the DRX gap. In particular, the static DRX aggregation procedure at 204 is performed/repeated from the current slot when the predefined static DRX update time (i.e., the predefined/fixed time when the static DRX update is performed) associated with current slot is not passed and the static DRX aggregation procedure at 204 is performed/repeated from the next slot when the predefined static DRX update time associated with current slot is passed. If No at 220*b*, the algorithm 200 proceeds to 222 where the DRX gap is detected. In some aspects, the DRX gap is detected at a time instance immediately after the dynamic DRX update, for example, within the same symbol when the dynamic DRX update at 220 is performed. In some aspects, the start time of the DRX gap coincides with the time the DRX gap is detected at 222. In some aspects, the DRX gap starts within the same symbol the dynamic DRX update is performed.

Figure 7:
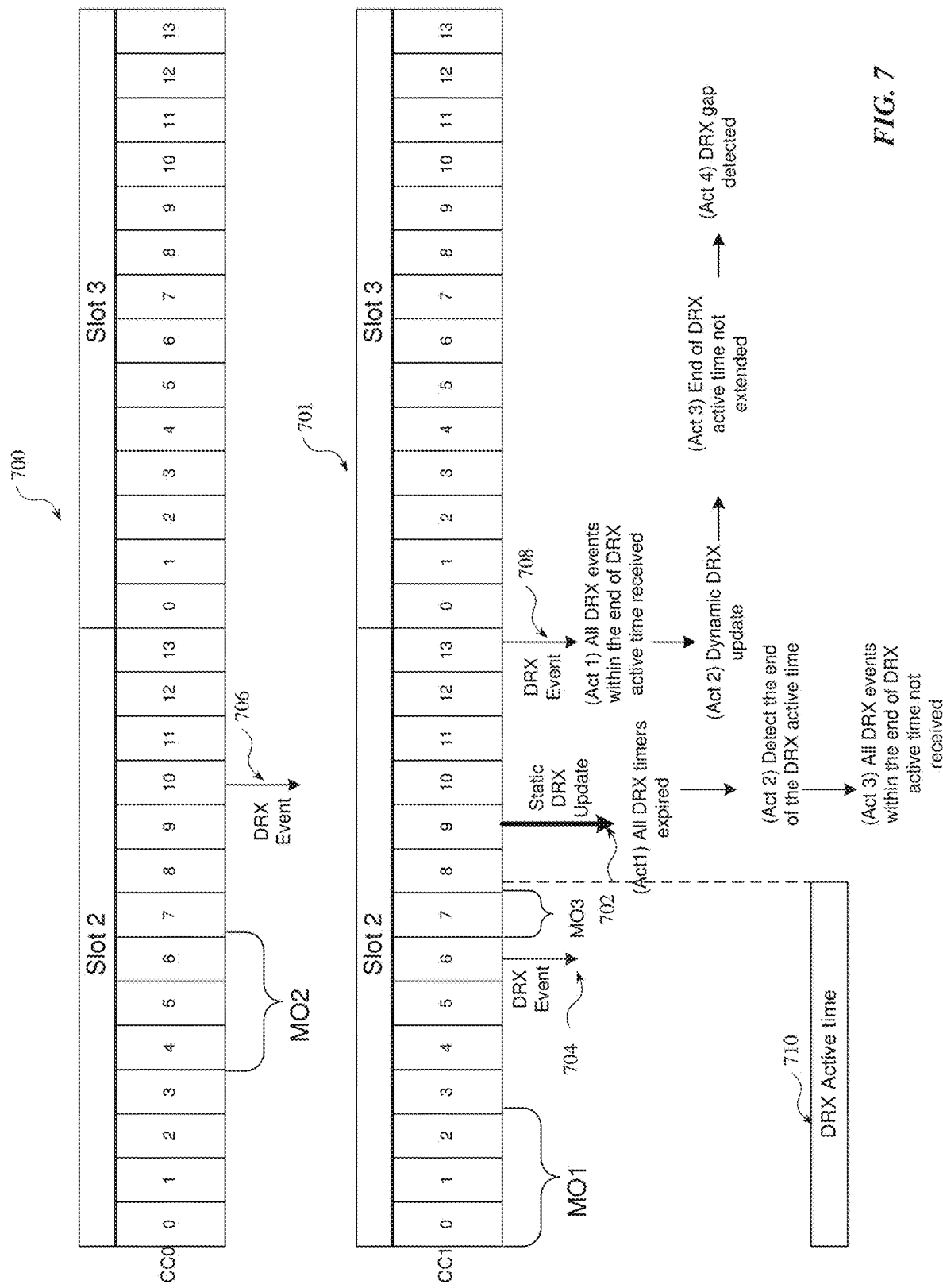
FIG. 7 illustrates an example implementation of a scenario for a static DRX update, where all the DRX events associated with all the PDCCH monitoring occasions (associated with 2 component carriers) within the computed end of DRX active are not received at the time of a static DRX update and a dynamic DRX event aggregation is initiated, according to one aspect of the disclosure.

FIG. 7 illustrates an example implementation of a scenario 700 for a static DRX update, where all the DRX events associated with all the PDCCH monitoring occasions (associated with 2 component carriers) within the computed end of DRX active time are not received at the time of a static DRX update (corresponding to a No at 212 in algorithm 200 in FIG. 2) and a dynamic DRX event aggregation (corresponding to the dynamic DRX event aggregation at 216 in the algorithm 200 in FIG. 2) is initiated, according to one aspect of the disclosure. In particular, a static DRX update 702 (i.e., based on act 206 in the algorithm 200) associated with a static DRX aggregation procedure is performed by the UE in symbol 9 (which forms the predefined static DRX update time) of slot 2 of a radio frame 701. At the time of the static DRX update 702, at a first act, Act 1, it is determined that all the DRX timers are expiring in slot 2 (i.e., based on act 206*c* of the algorithm 200). In some aspects, the slot 2 in FIG. 6 may correspond to the slot 2 in FIG. 3, where all the DRX timers are determined to expire. At a second act, Act 2, an end of the DRX active time 710 is computed (i.e., based on act 210 of the algorithm 200). The act 2 is performed immediately after the act 1 within the symbol 9 (i.e., the predefined static DRX update time) in slot 2). It can be seen that the DRX active time 710 ends in symbol 8 of slot 2, and that there are three PDCCH monitoring occasions, MO1, MO2, MO3 within the end of the DRX active time 710.

At a third act, Act 3, a determination that all the DRX events associated with the PDCCH MOs within the computed end of the DRX active time 710 are not received is made by the UE (i.e., No at 212 of the algorithm 200). The act 3 is performed immediately after the act 2 within the symbol 9 (i.e., the predefined static DRX update time) in slot 2). In particular, while the DRX event 704 (associated with MO1) is received at the time of the static DRX update 702, the DRX event 706 (associated with MO2) and the DRX event 708 (associated with MO3) are not received at the time of the static DRX update 702. In some aspects, the determination that all the DRX events associated with the PDCCH MOs within the computed end of the DRX active time 710 are not received is made based on a PDCCH MO bitmap (e.g., the PDCCH MO bitmap 500 in FIG. 5).

Subsequently, in FIG. 7, the UE proceeds to perform a dynamic DRX event aggregation (i.e., based on the act 216 of the algorithm 200). During the dynamic DRX event aggregation, one or more subsequent DRX events, that is, the DRX event 706 and the DRX event 708 (after the time of the static DRX update 702) is received at the UE (i.e., based on the act 216*a* of the algorithm 200). Further, for each of the received DRX events 706 and 708, a determination whether all the DRX events associated with the PDCCH MOs within the computed end of the DRX active time 710 are received or not is made (i.e., based on the act 216*b* of the algorithm 200), upon receiving the respective events. As can be seen in FIG. 7, for the DRX event 708 (associated with the MO3) received (at symbol 13 of slot 2), at a first act, Act 1, a determination that all the DRX events associated with the PDCCH MOs within the computed end of the DRX active time 710 are received (i.e., Yes at 216*b* of algorithm 200) is made. The act 1 is performed at a time instance immediately after the time the DRX event 708 is received within symbol 13 of slot 2. Further, at a second act, Act 2, a dynamic DRX update comprising an aggregation of all the DRX timers configured for the UE (i.e., act 220*a* in algorithm 200) is performed. The act 2 is performed at a time instance immediately after the act 1 within symbol 13 of slot 2. At a third act, Act 3, a determination that the computed end of the DRX active time is not extended is made (i.e., based on the act 220*b* in algorithm 200). The act 3 is performed at a time instance immediately after the act 2 within symbol 13 of slot 2. Furthermore, at a fourth act, Act 4, a DRX gap is detected. The act 4 is performed at a time instance immediately after the act 3 within symbol 13 of slot 2.

Figure 8:
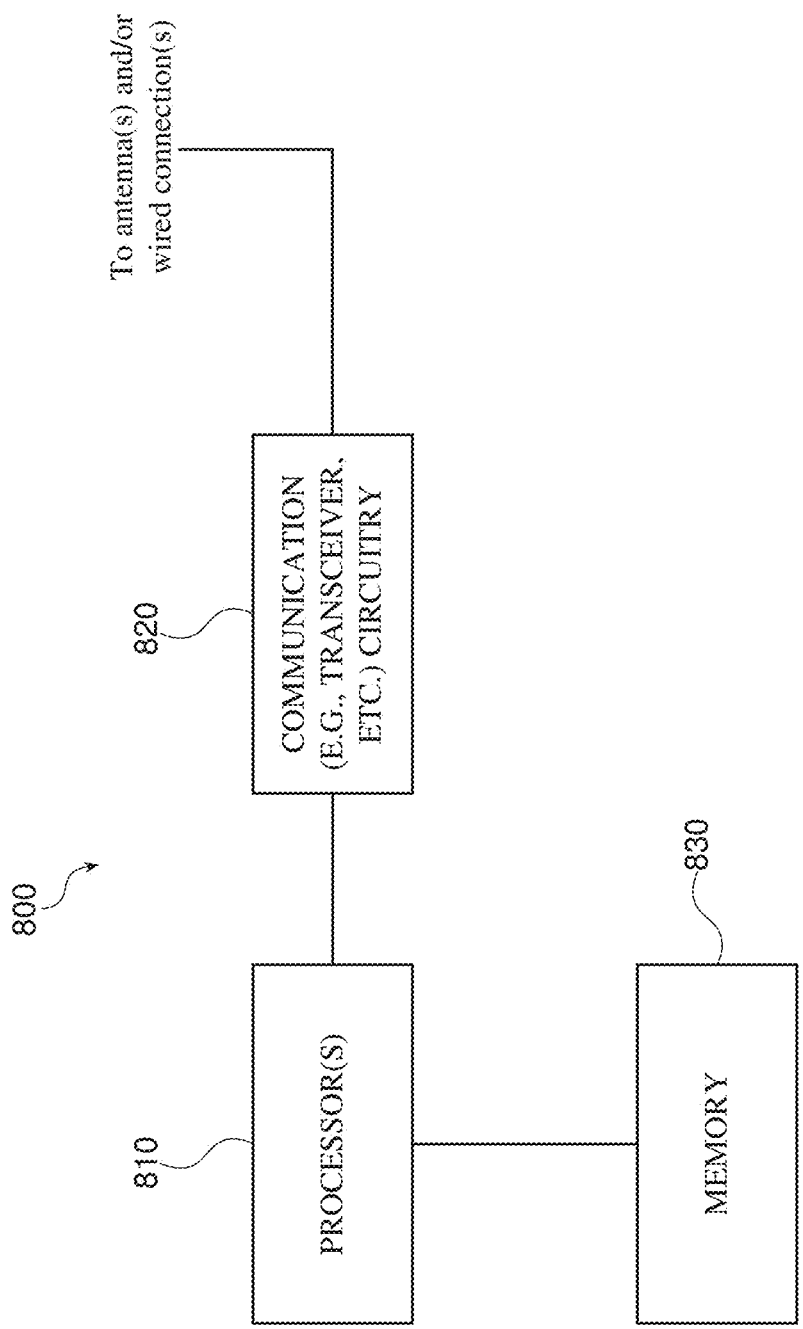
FIG. 8 illustrates a block diagram of an apparatus employable at a Base Station (BS), eNodeB, gNodeB or other network device, according to various aspects described herein.

Referring to FIG. 8, illustrated is a block diagram of an apparatus 800 employable at a Base Station (BS), eNodeB, gNodeB or other network device, according to various aspects described herein. In some aspects, the apparatus 800 may be included within the base station 102 in FIG. 1.

However, in other aspects, the apparatus 800 could be included within any base station associated with a wireless communication system. The apparatus 800 can include one or more processors 810 (e.g., one or more baseband processors such as one or more of the baseband processors discussed in connection with FIG. 12 and/or FIG. 13) comprising processing circuitry and associated interface(s) (e.g., one or more interface(s) discussed in connection with FIG. 13), communication (e.g., transceiver) circuitry 820 (e.g., which can comprise circuitry for one or more wired connections and/or part or all of RF circuitry 1206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 830 (which can comprise any of a variety of storage mediums and can store instructions and/or data associated with one or more of processor(s) 810 or communication circuitry 820).

In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 800 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 810, communication circuitry 820, and the memory 830 can be included in a single device, while in other aspects, they can be included in different devices, such as part of a distributed architecture. In some aspects, the one or more processors 810, the communication circuitry 820 and the memory 830 may be implemented as part of a modem system on a single integrated circuit (IC). Alternately, in other aspects, the one or more processors 810, the communication circuitry 820 and the memory 830 may be implemented on different ICs.

Figure 9:
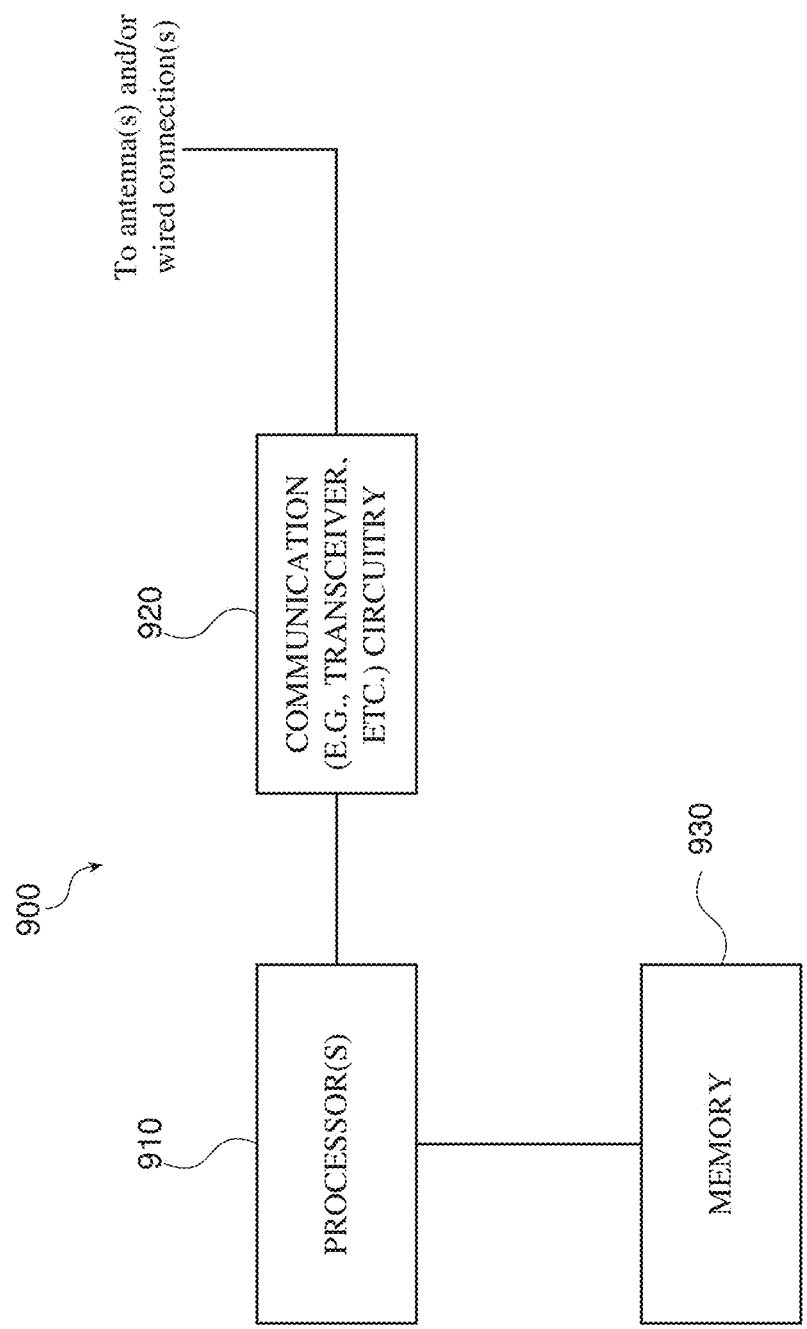
FIG. 9 illustrates a block diagram of an apparatus employable at a user equipment (UE) or other network device (e.g., IoT device), according to various aspects described herein.

Referring to FIG. 9, illustrated is a block diagram of an apparatus 900 employable at a user equipment (UE) or other network device (e.g., IoT device), according to various aspects described herein. In some aspects, the apparatus 900 may be included within the UE 104 in FIG. 1. However, in other aspects, the apparatus 900 could be included within any UE associated with a wireless communication system. Apparatus 900 can include one or more processors 910 (e.g., one or more baseband processors such as one or more of the baseband processors discussed in connection with FIG. 12 and/or FIG. 13) comprising processing circuitry and associated interface(s) (e.g., one or more interface(s) discussed in connection with FIG. 13), communication (e.g., transceiver) circuitry 920 (e.g., comprising part or all of RF circuitry 1206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 930 (which can comprise any of a variety of storage mediums and can store instructions and/or data associated with one or more of processor(s) 910 or communication circuitry 920). In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof.

In various aspects discussed herein, signals and/or messages can be generated and output for transmission, and/or transmitted messages can be received and processed. Depending on the type of signal or message generated, outputting for transmission (e.g., by processor(s) 910) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 910) can comprise one or more of: identifying physical resources associated with the signal/message, detecting the signal/message, resource element group deinterleaving, demodulation, descrambling, and/or decoding. In some aspects, the one or more processors 910, the communication circuitry 920 and the memory 930 may be implemented as part of a modem system on a single integrated circuit (IC). Alternately, in other aspects, the one or more processors 910, the communication circuitry 920 and the memory 930 may be implemented on different ICs.

Figure 10:
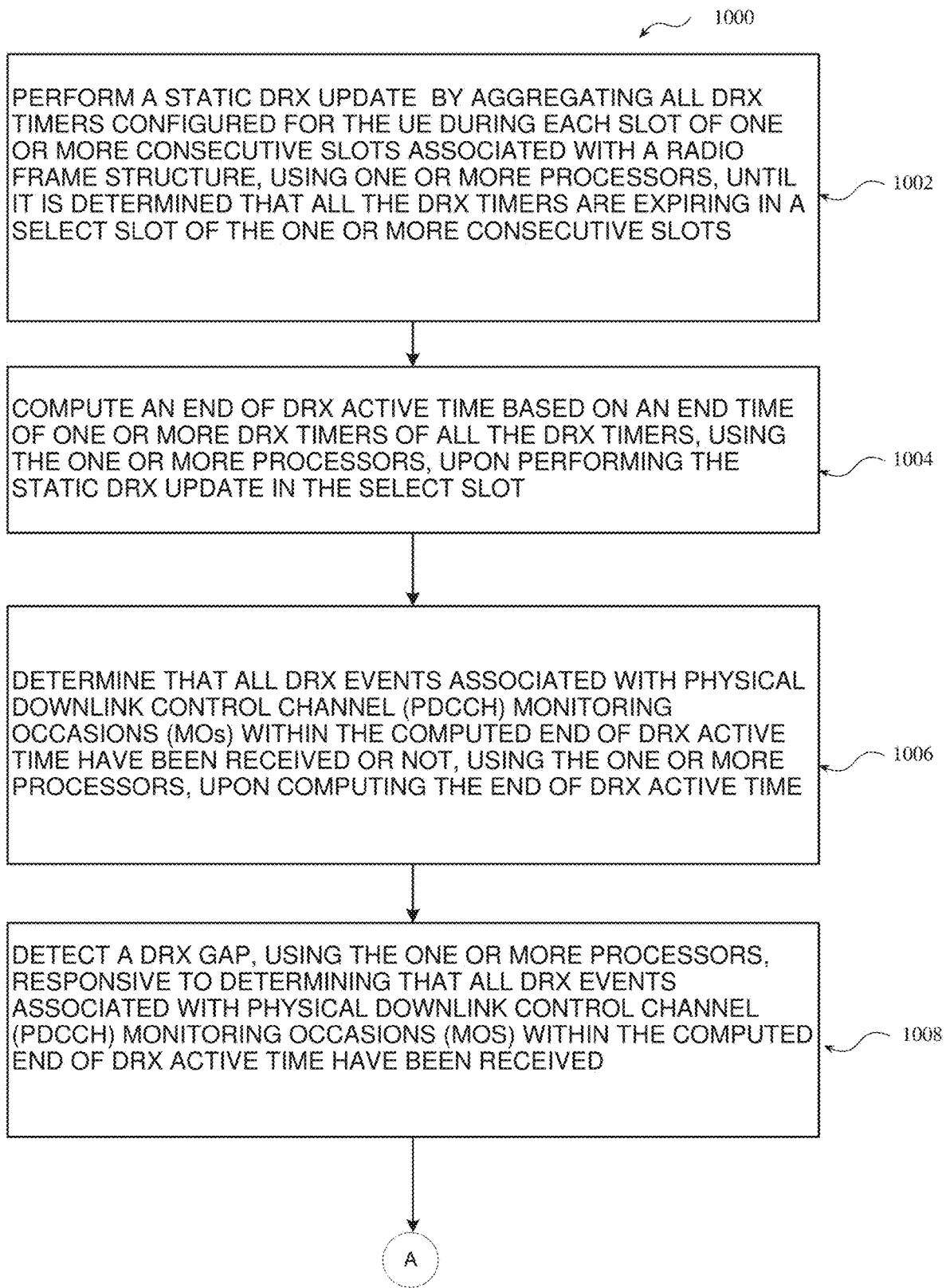
FIG. 10 illustrates a flowchart of a method for a UE associated with a wireless communication system, when the UE is configured with discontinuous reception (DRX) operation, according to one aspect of the disclosure.
Figure 10:
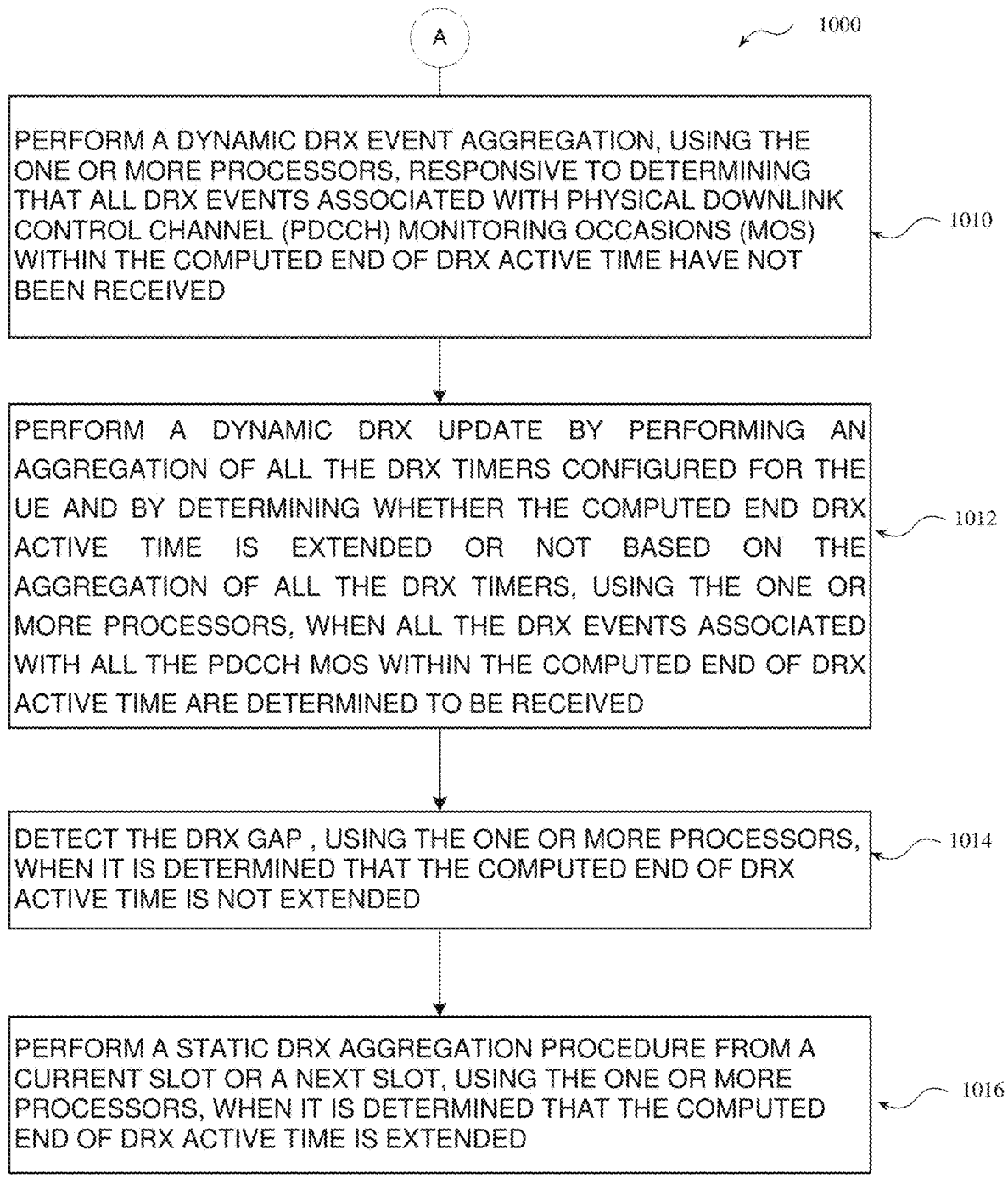

FIG. 10 illustrates a flowchart of a method 1000 for a UE associated with a wireless communication system, when the UE is configured with discontinuous reception (DRX) operation, according to one aspect of the disclosure. The method 1000 is explained herein with reference to the apparatus 900 in FIG. 9. In some aspects, the apparatus 900 could be included within the UE 104 in FIG. 1. Further, the algorithm 200 in FIG. 2 may be implemented using the apparatus 900. Therefore, the method 1000 is further explained with reference to the wireless communication system 100 in FIG. 1 and the algorithm 200 in FIG. 2. At 1002, a static DRX update (i.e., the static DRX update at 206 in algorithm 200) is performed, using one or more processors 910, by aggregating all DRX timers configured for the UE (i.e., the act 206a in the algorithm 200) during each slot of one or more consecutive slots associated with a radio frame structure. In some aspects, the static DRX update is performed at a predefined static DRX update time associated with each slot of the one or more consecutive slots. In some aspects, the static DRX update is performed in the one or more consecutive slots until it is determined, by the one or more processors 910, that all the DRX timers are expiring in a select slot of the one or more consecutive slots (e.g., slot 2 in FIG. 3, FIG. 6 and FIG. 7). In some aspects, the determination that all the DRX timers are expiring in a select slot is made based on the static DRX update performed in the select slot. In some aspects, performing the static DRX update in each slot of the one or more consecutive slots (in the act 1002 above) constitutes a static DRX aggregation procedure (i.e., the static DRX aggregation procedure at 204 in the algorithm 200). In some aspects, the static DRX update in each slot of the one or more consecutive slots is performed by further evaluating all the DRX timers (or the end time of all the DRX timers) aggregated in a respective slot of the one or more consecutive slots against an end of the respective slot (i.e., the act 206*b* in the algorithm 200), and determining whether all the DRX timers expire in the respective slot in accordance with the evaluation in the respective slot (i.e., the act 206*c* in the algorithm 200).

At 1004, an end of DRX active time is computed (i.e., the act 210 in algorithm 200), using the one or more processors 910. In some aspects, the end of the DRX active time is computed based on an end time of one or more DRX timers of all the DRX timers (e.g., using the DRX active time determination algorithm 400 in FIG. 4). In some aspects, the end of the DRX active time is computed upon performing the static DRX update in the select slot, in particular, at a time instance immediately after the static DRX update in the select slot. At 1006, a determination that all DRX events associated with physical downlink control channel (PDCCH) monitoring occasions (MOs) within the computed end of DRX active time have been received or not is made (i.e., the act 212 in algorithm 200), using the one or more processors 910. In some aspects, the determination at 1006 above is made upon computing the end of the DRX active time, in particular, at a time instance immediately after computing the end of the DRX active time. At 1008, a DRX gap is detected (i.e., the act 214 in algorithm 200), using the one or more processors 910. In some aspects, the DRX gap is detected responsive to determining that all DRX events associated with all physical downlink control channel (PDCCH) monitoring occasions (MOs) within the computed end of DRX active time are received (i.e., Yes at 212 in algorithm 200) at 1006 above. In some aspects, the DRX gap is detected upon performing the determination at 1006 above, in particular, at a time instance immediately after performing the determination at 1006. In some aspects, a start time of the DRX gap coincides with the predefined static DRX update time associated with the select slot when the DRX gap is detected.

At 1010, a dynamic DRX event aggregation (i.e., the dynamic DRX event aggregation 216 in algorithm 200) is performed, using the one or more processors 910. In some aspects, the dynamic DRX event aggregation is performed by receiving one or more subsequent DRX events (i.e., the act 216*a* in the algorithm 200) and determining whether all the DRX events associated with all the PDCCH MOs within the computed end of DRX active time are received (i.e., the act 216*b* in the algorithm 200), upon receiving each of the one or more subsequent DRX events. In some aspects, the dynamic DRX event aggregation is performed responsive to determining that all the DRX events associated with all the PDCCH MOs within the computed end of DRX active time are not received at the one or more processors 910 (i.e., No at 212 in the algorithm 200) at 1006 above. In some aspects, the dynamic DRX event aggregation is performed until it is determined that all the DRX events associated with all the PDCCH MOs within the computed end of DRX active time are received at the one or more processors (i.e., Yes at 216*b* in the algorithm 200) upon receiving a corresponding DRX event of the one or more subsequent DRX events, or until an end of a current DRX cycle is reached (i.e., Yes at 216*c* in the algorithm 200), whichever is earlier.

At 1012, a dynamic DRX update (e.g., the dynamic DRX update 220 in algorithm 200) is performed, using the one or more processors 910. During the dynamic DRX update, an aggregation of all the DRX timers configured for the UE is performed (e.g., at 220*a* in algorithm 200). Further, a determination whether the computed end of DRX active time is extended or not is made based on the aggregation of all the DRX timers (e.g., at 220*b* in the algorithm 200), during the dynamic DRX update. In some aspects, the dynamic DRX update is performed when it is determined that all the DRX events associated with all the PDCCH MOs within the computed end of DRX active time are received at the one or more processors (i.e., Yes at 216*b* in the algorithm 200), upon receiving the corresponding DRX event, as part of the dynamic DRX event aggregation at 1010. In some aspects, the dynamic DRX update is performed at a time instance immediately after the corresponding DRX event is received at the one or more processors 910. For example, if the corresponding DRX event is received in symbol 9 of a particular slot, then the dynamic DRX update is also performed in the symbol 9 of the particular slot. In some aspects, the determination that the computed end of DRX active time is extended is made when it is determined that all the DRX timers are not expired based on the aggregation of all the DRX timers performed as part of the dynamic DRX update.

At 1014, the DRX gap is detected (i.e., the act 222 in the algorithm 200) upon performing the dynamic DRX update, using the one or more processors 910. In some aspects, the DRX gap is detected, when it is determined that the computed end of the DRX active time is not extended (i.e., No at 220*b*), as part of the dynamic DRX update at 1012. In some aspects, the DRX gap is detected at the time instance immediately after the time of the dynamic DRX update. For example, if the dynamic DRX update is performed at symbol 9 of a particular slot, then the DRX gap is also detected within the symbol 9 of the particular slot. In some aspects, a start time of the DRX gap coincides with the time the DRX gap is detected. At 1016, the static DRX aggregation procedure (i.e., the static DRX aggregation procedure 204 in the algorithm 200) that comprises performing the static DRX update during each slot of one or more consecutive slots, is performed/repeated from a current slot or a next slot, using the one or more processors 910, in order to detect the DRX gap. In some aspects, the static DRX aggregation procedure is performed/repeated from the current slot or the next slot, when it is determined that the computed end of the DRX active time is extended (i.e., Yes at 220*b*), as part of the dynamic DRX update at 1012. The static DRX aggregation procedure is performed/repeated from the current slot when the predefined static DRX update time associated with the current slot is not passed and the static DRX aggregation procedure is performed/repeated from the next slot when the predefined static DRX update time associated with current slot is passed. Although not shown, all the features associated with the algorithm 200 are also applicable to the method 1000 disclosed herein.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or aspects of the disclosure herein. Also, one or more of the acts depicted herein may be carried out in one or more separate acts and/or phases.

Figure 11:
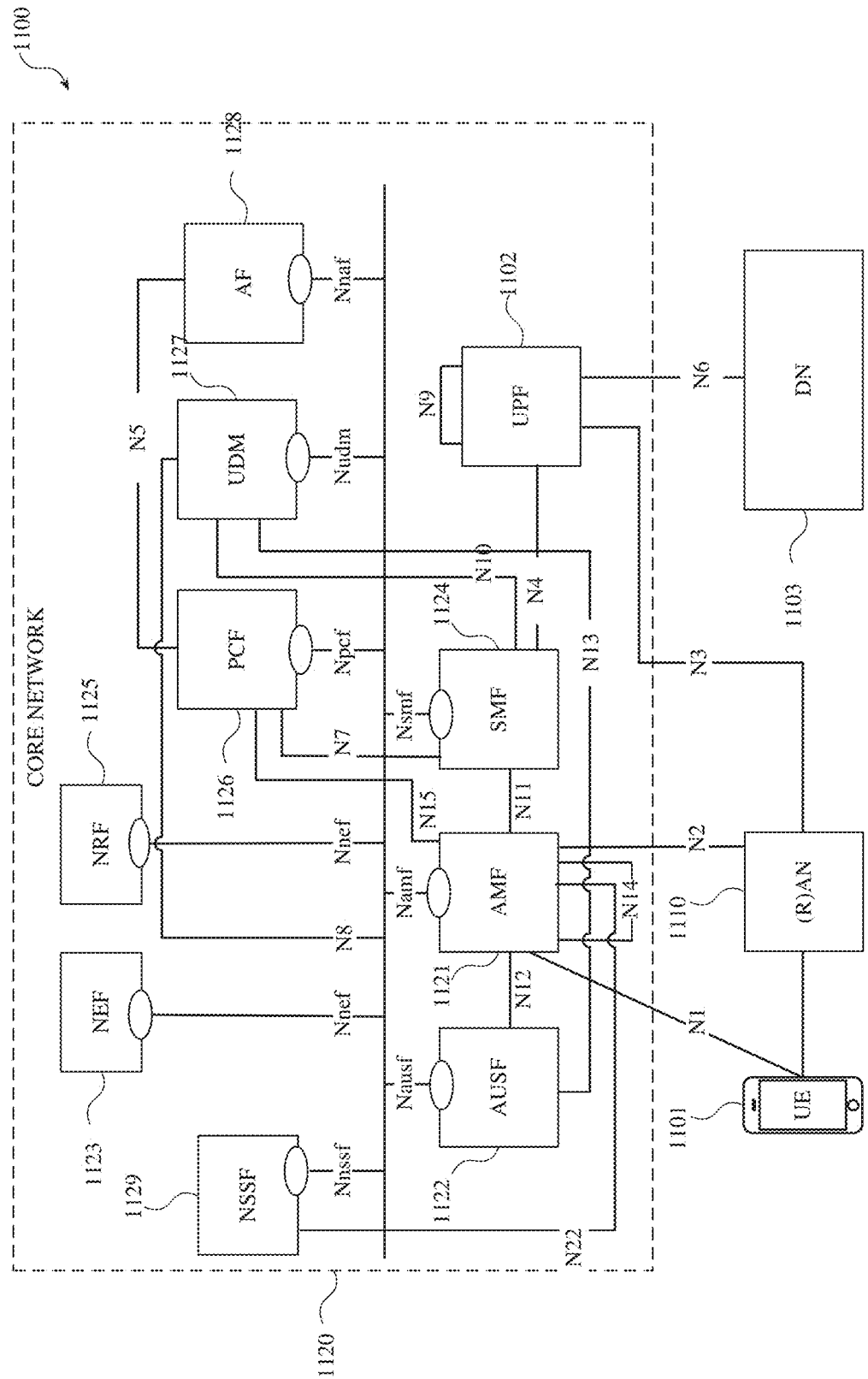
FIG. 11 illustrates an architecture of a system including a Core Network (CN), for example a Fifth Generation (5G) CN (5GC), in accordance with various aspects.

Aspects described herein can be implemented into a system using any suitably configured hardware and/or software. FIG. 11 illustrates an architecture of a system 1100 including a Core Network (CN) 1120, for example a Fifth Generation (5G) CN (5GC), in accordance with various aspects. The system 1100 is shown to include a UE 1101, which can be the same or similar to one or more other UEs discussed herein; a Third Generation Partnership Project (3GPP) Radio Access Network (Radio AN or RAN) or other (e.g., non-3GPP) AN, (R)AN, which can include one or more RAN nodes (e.g., Evolved Node B(s) (eNB(s)), next generation Node B(s) (gNB(s), and/or other nodes) or other nodes or access points; and a Data Network (DN), which can be, for example, operator services, Internet access or third party services; and a Fifth Generation Core Network (5GC) 1120. The 5GC 1120 can comprise one or more of the following functions and network components: an Authentication Server Function (AUSF) 1122; an Access and Mobility Management Function (AMF) 1121; a Session Management Function (SMF) 1124; a Network Exposure Function (NEF) 723; a Policy Control Function (PCF) 1126; a Network Repository Function (NRF) 1125; a Unified Data Management (UDM) 1127; an Application Function (AF) 1128; a User Plane (UP) Function (UPF) 1102; and a Network Slice Selection Function (NSSF) 1129.

The UPF 1102 can act as an anchor point for intra-RAT and inter-RAT mobility, an external Protocol Data Unit (PDU) session point of interconnect to DN 1103, and a branching point to support multi-homed PDU session. The UPF 1102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1102 can include an uplink classifier to support routing traffic flows to a data network. The DN 1103 can represent various network operator services, Internet access, or third-party services. DN 1103 can include, or be similar to, an application server. The UPF 1102 can interact with the SMF 1124 via an N4 reference point between the SMF 1124 and the UPF 1102.

The AUSF 1122 can store data for authentication of UE 1101 and handle authentication-related functionality. The AUSF 1122 can facilitate a common authentication framework for various access types. The AUSF 1122 can communicate with the AMF 1121 via an N12 reference point between the AMF 1121 and the AUSF 1122; and can communicate with the UDM 1127 via an N13 reference point between the UDM 1127 and the AUSF 1122. Additionally, the AUSF 1122 can exhibit an Nausf service-based interface.

The AMF 1121 can be responsible for registration management (e.g., for registering UE 1101, etc.), connection management, reachability management, mobility management, and lawful interception of AMF-related events, and access authentication and authorization. The AMF 1121 can be a termination point for the an N11 reference point between the AMF 1121 and the SMF 1124. The AMF 1121 can provide transport for SM messages between the UE 1101 and the SMF 1124, and act as a transparent proxy for routing SM messages. AMF 1121 can also provide transport for SMS messages between UE 1101 and a Short Message Service (SMS) Function (SMSF) (not shown in FIG. 7). AMF 1121 can act as SEcurity Anchor Function (SEAF), which can include interaction with the AUSF 1122 and the UE 1101 and/or receipt of an intermediate key that was established as a result of the UE 1101 authentication process. Where Universal Subscriber Identity Module (USIM) based authentication is used, the AMF 1121 can retrieve the security material from the AUSF 1122. AMF 1121 can also include a Single-Connection Mode (SCM) function, which receives a key from the SEA that it uses to derive access-network specific keys. Furthermore, AMF 1121 can be a termination point of a RAN Control Plane (CP) interface, which can include or be an N2 reference point between the (R)AN 1110 and the AMF 1121; and the AMF 1121 can be a termination point of Non Access Stratum (NAS) (N1) signaling, and perform NAS ciphering and integrity protection.

AMF 1121 can also support NAS signaling with a UE 1101 over an Non-3GPP (N3) Inter Working Function (IWF) interface. The N3IWF can be used to provide access to untrusted entities. N3 IWF can be a termination point for the N2 interface between the (R)AN 1110 and the AMF 1121 for the control plane, and can be a termination point for the N3 reference point between the (R)AN 1110 and the UPF 1102 for the user plane. As such, the AMF 1121 can handle N2 signaling from the SMF 1124 and the AMF 1121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3 IWF can also relay uplink and downlink control-plane NAS signaling between the UE 1101 and AMF 1121 via an N1 reference point between the UE 1101 and the AMF 1121, and relay uplink and downlink user-plane packets between the UE 1101 and UPF 1102. The N3IWF also provides mechanisms for IPsec tunnel establishment with the UE 1101. The AMF 1121 can exhibit an Namf service-based interface, and can be a termination point for an N14 reference point between two AMFs 1121 and an N17 reference point between the AMF 1121 and a 5G Equipment Identity Register (5G-EIR) (not shown in FIG. 11).

The UE 1101 can be registered with the AMF 1121 in order to receive network services. Registration Management (RM) is used to register or deregister the UE 1101 with the network (e.g., AMF 1121), and establish a UE context in the network (e.g., AMF 1121). The UE 1101 can operate in an RM-REGISTERED state or an RM-DEREGISTERED state. In the RM-DEREGISTERED state, the UE 1101 is not registered with the network, and the UE context in AMF 1121 holds no valid location or routing information for the UE 1101 so the UE 1101 is not reachable by the AMF 1121. In the RM-REGISTERED state, the UE 1101 is registered with the network, and the UE context in AMF 1121 can hold a valid location or routing information for the UE 1101 so the UE 1101 is reachable by the AMF 1121. In the RM-REGISTERED state, the UE 1101 can perform mobility Registration Update procedures, perform periodic Registration Update procedures triggered by expiration of the periodic update timer (e.g., to notify the network that the UE 1101 is still active), and perform a Registration Update procedure to update UE capability information or to re-negotiate protocol parameters with the network, among others.

The AMF 1121 can store one or more RM contexts for the UE 1101, where each RM context is associated with a specific access to the network. The RM context can be a data structure, database object, etc. that indicates or stores, inter alia, a registration state per access type and the periodic update timer. The AMF 1121 can also store a 5GC Mobility Management (MM) context that can be the same or similar to an (Enhanced Packet System (EPS))MM ((E)MM) context. In various aspects, the AMF 1121 can store a Coverage Enhancement (CE) mode B Restriction parameter of the UE 1101 in an associated MM context or RM context. The AMF 1121 can also derive the value, when needed, from the UE's usage setting parameter already stored in the UE context (and/or MM/RM context).

Connection Management (CM) can be used to establish and release a signaling connection between the UE 1101 and the AMF 1121 over the N1 interface. The signaling connection is used to enable NAS signaling exchange between the UE 1101 and the CN 1120, and comprises both the signaling connection between the UE and the AN (e.g., RRC connection or UE-N3 IWF connection for non-3GPP access) and the N2 connection for the UE 1101 between the AN (e.g., RAN 1110) and the AMF 1121. The UE 1101 can operate in one of two CM states, CM-IDLE mode or CM-CONNECTED mode. When the UE 1101 is operating in the CM-IDLE state/mode, the UE 1101 may have no NAS signaling connection established with the AMF 1121 over the N1 interface, and there can be (R)AN 1110 signaling connection (e.g., N2 and/or N3 connections) for the UE 1101. When the UE 1101 is operating in the CM-CONNECTED state/mode, the UE 1101 can have an established NAS signaling connection with the AMF 1121 over the N1 interface, and there can be a (R)AN 1110 signaling connection (e.g., N2 and/or N3 connections) for the UE 1101. Establishment of an N2 connection between the (R)AN 1110 and the AMF 1121 can cause the UE 1101 to transition from CM-IDLE mode to CM-CONNECTED mode, and the UE 1101 can transition from the CM-CONNECTED mode to the CM-IDLE mode when N2 signaling between the (R)AN 1110 and the AMF 1121 is released.

The SMF 1124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1101 and a data network (DN) 1103 identified by a Data Network Name (DNN). PDU sessions can be established upon UE 1101 request, modified upon UE 1101 and 5GC 1120 request, and released upon UE 1101 and 5GC 1120 request using NAS SM signaling exchanged over the N1 reference point between the UE 1101 and the SMF 1124. Upon request from an application server, the 5GC 1120 can trigger a specific application in the UE 1101. In response to receipt of the trigger message, the UE 1101 can pass the trigger message (or relevant parts/information of the trigger message) to one or more identified applications in the UE 1101. The identified application(s) in the UE 1101 can establish a PDU session to a specific DNN. The SMF 1124 can check whether the UE 1101 requests are compliant with user subscription information associated with the UE 1101. In this regard, the SMF 1124 can retrieve and/or request to receive update notifications on SMF 1124 level subscription data from the UDM 1127.

The SMF 1124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1124 can be included in the system 1100, which can be between another SMF 1124 in a visited network and the SMF 1124 in the home network in roaming scenarios. Additionally, the SMF 1124 can exhibit the Nsmf service-based interface.

The NEF 1123 can provide means for securely exposing the services and capabilities provided by 3GPP network functions for third party, internal exposure/re-exposure, Application Functions (e.g., AF 1128), edge computing or fog computing systems, etc. In such aspects, the NEF 1123 can authenticate, authorize, and/or throttle the AFs. NEF 1123 can also translate information exchanged with the AF 1128 and information exchanged with internal network functions. For example, the NEF 1123 can translate between an AF-Service-Identifier and an internal 5GC information. NEF 1123 can also receive information from other network functions (NFs) based on exposed capabilities of other network functions. This information can be stored at the NEF 1123 as structured data, or at a data storage NF using standardized interfaces. The stored information can then be re-exposed by the NEF 1123 to other NFs and AFs, and/or used for other purposes such as analytics. Additionally, the NEF 1123 can exhibit an Nnef service-based interface.

The NRF 1125 can support service discovery functions, receive NF discovery requests from NF instances, and provide the information of the discovered NF instances to the NF instances. NRF 1125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1125 can exhibit the Nnrf service-based interface.

The PCF 1126 can provide policy rules to control plane function(s) to enforce them, and can also support unified policy framework to govern network behavior. The PCF 1126 can also implement an FE to access subscription information relevant for policy decisions in a UDR of the UDM 1127. The PCF 1126 can communicate with the AMF 1121 via an N15 reference point between the PCF 1126 and the AMF 1121, which can include a PCF 1126 in a visited network and the AMF 1121 in case of roaming scenarios. The PCF 1126 can communicate with the AF 1128 via an N5 reference point between the PCF 1126 and the AF 1128; and with the SMF 1124 via an N7 reference point between the PCF 1126 and the SMF 1124. The system 1100 and/or CN 1120 can also include an N24 reference point between the PCF 1126 (in the home network) and a PCF 1126 in a visited network. Additionally, the PCF 1126 can exhibit an Npcf service-based interface.

The UDM 1127 can handle subscription-related information to support the network entities' handling of communication sessions, and can store subscription data of UE 1101. For example, subscription data can be communicated between the UDM 1127 and the AMF 1121 via an N8 reference point between the UDM 1127 and the AMF. The UDM 1127 can include two parts, an application Functional Entity (FE) and a Unified Data Repository (UDR) (the FE and UDR are not shown in FIG. 7). The UDR can store subscription data and policy data for the UDM 1127 and the PCF 1126, and/or structured data for exposure and application data (including Packet Flow Descriptions (PFDs) for application detection, application request information for multiple UEs 1101) for the NEF 1123. The Nudr service-based interface can be exhibited by the UDR 221 to allow the UDM 1127, PCF 1126, and NEF 1123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1124 via an N10 reference point between the UDM 1127 and the SMF 1124. UDM 1127 can also support SMS management, wherein an SMS-FE implements similar application logic as discussed elsewhere herein. Additionally, the UDM 1127 can exhibit the Nudm service-based interface.

The AF 1128 can provide application influence on traffic routing, provide access to NEF 1123, and interact with the policy framework for policy control. 5GC 1120 and AF 1128 can provide information to each other via NEF 1123, which can be used for edge computing implementations. In such implementations, the network operator and third party services can be hosted close to the UE 1101 access point of attachment to achieve an efficient service delivery through the reduced end-to-end latency and load on the transport network. For edge computing implementations, the 5GC can select a UPF 1102 close to the UE 1101 and execute traffic steering from the UPF 1102 to DN 1103 via the N6 interface. This can be based on the UE subscription data, UE location, and information provided by the AF 1128. In this way, the AF 1128 can influence UPF (re)selection and traffic routing. Based on operator deployment, when AF 1128 is considered to be a trusted entity, the network operator can permit AF 1128 to interact directly with relevant NFs. Additionally, the AF 1128 can exhibit an Naf service-based interface.

The NSSF 1129 can select a set of network slice instances serving the UE 1101. The NSSF 1129 can also determine allowed Network Slice Selection Assistance Information (NSSAI) and the mapping to the subscribed Single NSSAIs (S-NSSAIs), as appropriate. The NSSF 1129 can also determine the AMF set to be used to serve the UE 1101, or a list of candidate AMF(s) 1121 based on a suitable configuration and possibly by querying the NRF 1125. The selection of a set of network slice instances for the UE 1101 can be triggered by the AMF 1121 with which the UE 1101 is registered by interacting with the NSSF 1129, which can lead to a change of AMF 1121. The NSSF 1129 can interact with the AMF 1121 via an N22 reference point between AMF 1121 and NSSF 1129; and can communicate with another NSSF 1129 in a visited network via an N31 reference point (not shown in FIG. 11). Additionally, the NSSF 1129 can exhibit an Nnssf service-based interface.

As discussed previously, the CN 1120 can include an SMSF, which can be responsible for SMS subscription checking and verification, and relaying SM messages to/from the UE 1101 to/from other entities, such as an SMS-Gateway Mobile services Switching Center (GMSC)/Inter-Working MSC (IWMSC)/SMS-router. The SMSF can also interact with AMF 1121 and UDM 1127 for a notification procedure that the UE 1101 is available for SMS transfer (e.g., set a UE not reachable flag, and notifying UDM 1127 when UE 1101 is available for SMS).

The CN 1120 can also include other elements that are not shown in FIG. 11, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 11). Individual NFs can share a UDSF for storing their respective unstructured data or individual NFs can each have their own UDSF located at or near the individual NFs. Additionally, the UDSF can exhibit an Nudsf service-based interface (not shown in FIG. 11). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 11 for clarity. In one example, the CN 1120 can include an Nx interface, which is an inter-CN interface between the MME (e.g., a non-5G MME) and the AMF 1121 in order to enable interworking between CN 1120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 12:
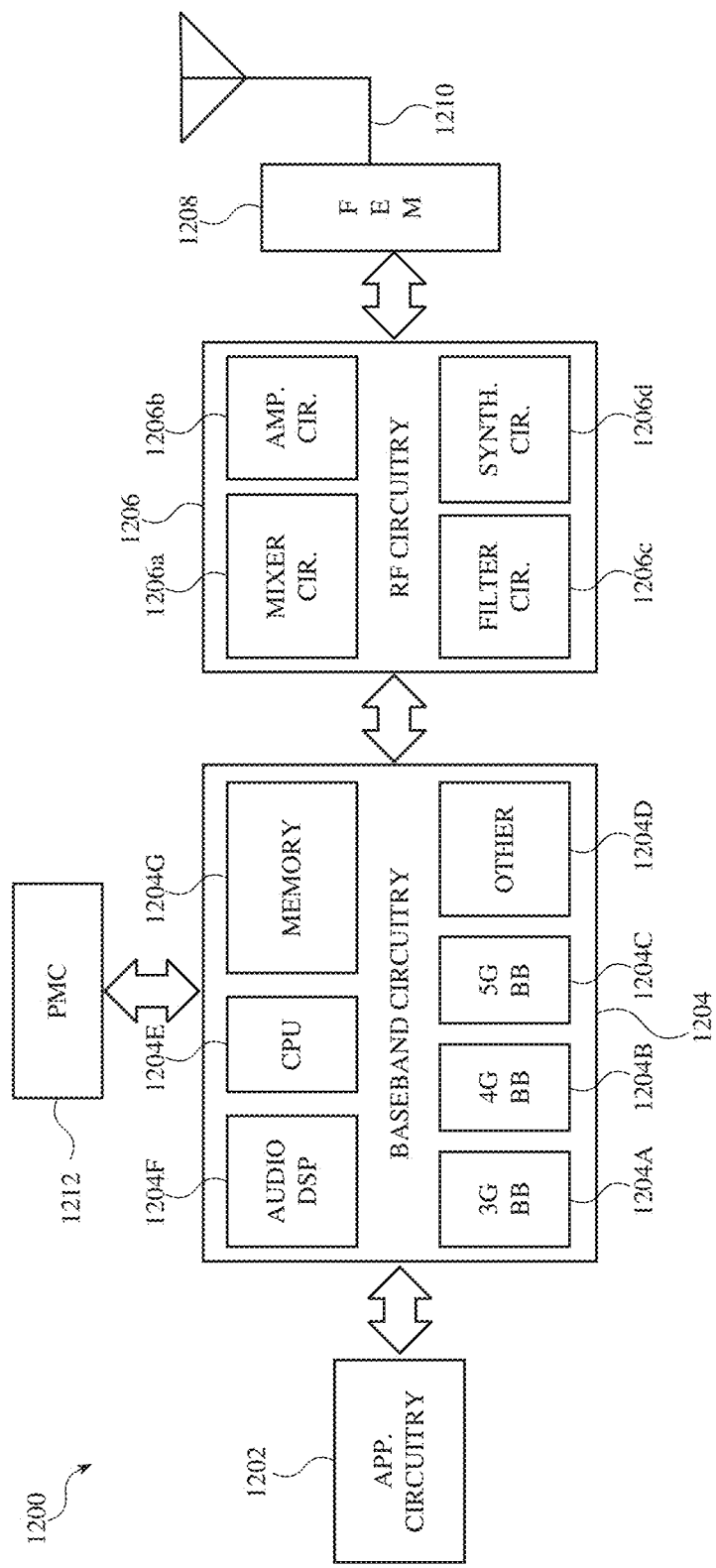
FIG. 12 illustrates example components of a device in accordance with some aspects.

FIG. 12 illustrates example components of a device 1200 in accordance with some aspects. In some aspects, the device 1200 can include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some aspects, the device 1200 can include fewer elements (e.g., a RAN node may not utilize application circuitry 1202, and instead include a processor/controller to process IP data received from a CN such as 5GC 720 or an Evolved Packet Core (EPC)). In some aspects, the device 1200 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some aspects, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband circuitry 1204 can interface with the application circuitry 1202 for generation and processing of the baseband signals and for controlling operations of the RF circuitry 1206. For example, in some aspects, the baseband circuitry 1204 can include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) can handle various radio control functions that enable communication with one or more radio networks via the RF circuitry 1206. In other aspects, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some aspects, modulation/demodulation circuitry of the baseband circuitry 1204 can include Fast-Fourier Transform (FFT), precoding, or constellation mapping/demapping functionality. In some aspects, encoding/decoding circuitry of the baseband circuitry 1204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1204 can include one or more audio digital signal processor(s) (DSP) 1204F. The audio DSP(s) 1204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1204 and the application circuitry 1202 can be implemented together such as, for example, on a system on a chip (SOC).

In some aspects, the baseband circuitry 1204 can provide for communication compatible with one or more radio technologies. For example, in some aspects, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various aspects, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some aspects, the receive signal path of the RF circuitry 1206 can include mixer circuitry 1206a, amplifier circuitry 1206b and filter circuitry 1206c. In some aspects, the transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some aspects, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some aspects, the output baseband signals can be zero-frequency baseband signals, although this is not a requirement. In some aspects, mixer circuitry 1206a of the receive signal path can comprise passive mixers, although the scope of the aspects is not limited in this respect.

In some aspects, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c.

In some aspects, the mixer circuitry 1206a of the receive signal path and the mixer circuitry 1206a of the transmit signal path can include two or more mixers and can be arranged for quadrature downconversion and upconversion, respectively. In some aspects, the mixer circuitry 1206a of the receive signal path and the mixer circuitry 1206a of the transmit signal path can include two or more mixers and can be arranged for image rejection (e.g., Hartley image rejection). In some aspects, the mixer circuitry 1206a of the receive signal path and the mixer circuitry 1206a can be arranged for direct downconversion and direct upconversion, respectively. In some aspects, the mixer circuitry 1206a of the receive signal path and the mixer circuitry 1206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode aspects, a separate radio IC circuitry can be provided for processing signals for each spectrum, although the scope of the aspects is not limited in this respect.

In some aspects, the synthesizer circuitry 1206d can be a fractional-N synthesizer or a fractional N/N+1 synthesizer, although the scope of the aspects is not limited in this respect as other types of frequency synthesizers can be suitable. For example, synthesizer circuitry 1206*d* can be a delta-sigma synthesizer, a frequency multiplier, or a synthesizer comprising a phase-locked loop with a frequency divider.

The synthesizer circuitry 1206*d* can be configured to synthesize an output frequency for use by the mixer circuitry 1206*a* of the RF circuitry 1206 based on a frequency input and a divider control input. In some aspects, the synthesizer circuitry 1206*d* can be a fractional N/N+1 synthesizer.

In some aspects, frequency input can be provided by a voltage controlled oscillator (VCO), although that is not a requirement. Divider control input can be provided by either the baseband circuitry 1204 or the application circuitry 1202 depending on the desired output frequency. In some aspects, a divider control input (e.g., N) can be determined from a look-up table based on a channel indicated by the application circuitry 1202.

Synthesizer circuitry 1206*d* of the RF circuitry 1206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1206*d* can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various aspects, the amplification through the transmit or receive signal paths can be done solely in the RF circuitry 1206, solely in the FEM circuitry 1208, or in both the RF circuitry 1206 and the FEM circuitry 1208.

In some aspects, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some aspects, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other aspects, the PMC 1212 may be additionally or alternatively coupled with, and perform similar power management operations for, other components such as, but not limited to, application circuitry 1202, RF circuitry 1206, or FEM circuitry 1208.

In some aspects, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the application circuitry 1202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
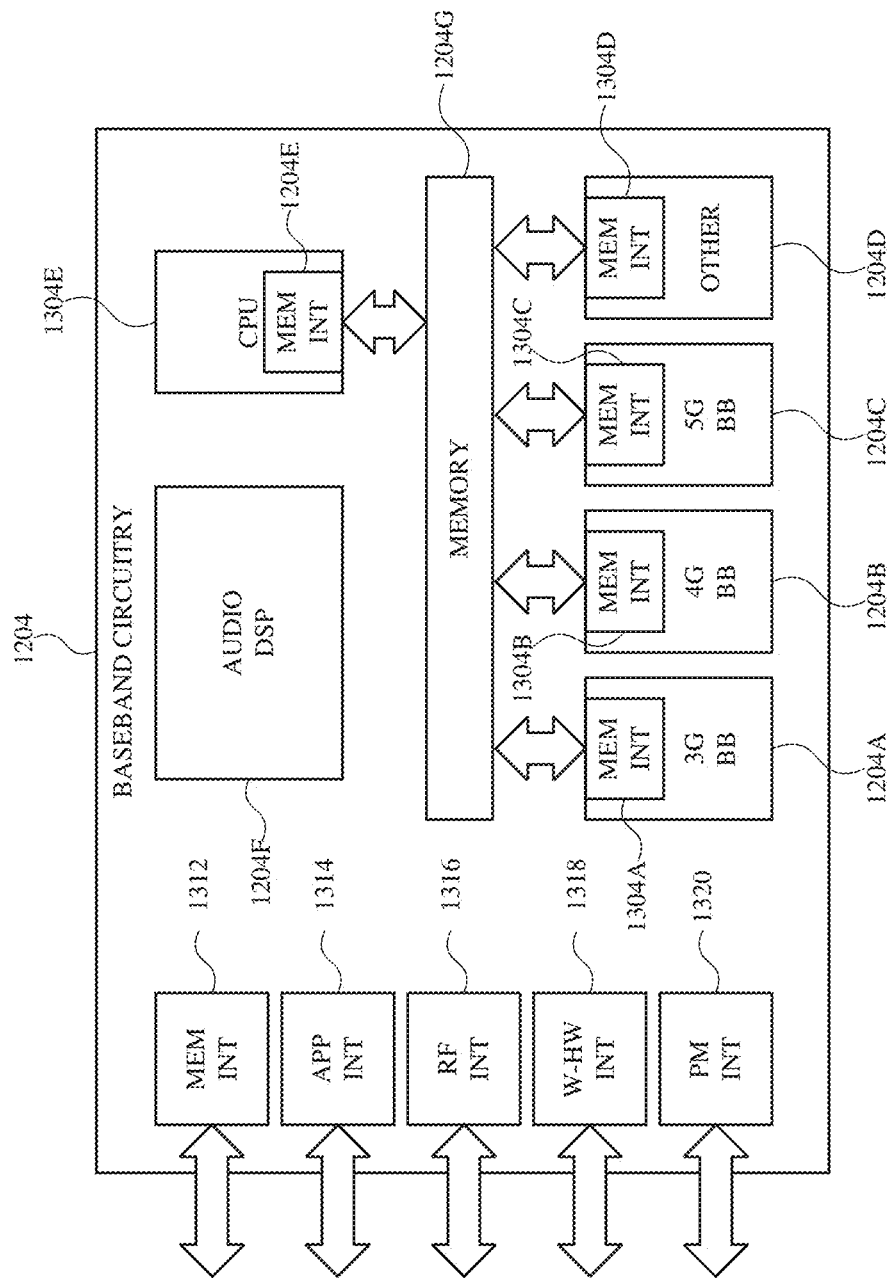
FIG. 13 illustrates example interfaces of baseband circuitry in accordance with some aspects.

FIG. 13 illustrates example interfaces of baseband circuitry in accordance with some aspects. As discussed above, the baseband circuitry 1204 of FIG. 2 can comprise processors 1204A-1204E and a memory 1204G utilized by said processors. Each of the processors 1204A-1204E can include a memory interface, 1304A-1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 802 of FIG. 2), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

In various aspects, aspects discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

What is claimed is:

1. A user equipment (UE) configured for discontinuous reception (DRX) operation, comprising:
   radio frequency (RF) circuitry;
   a memory; and
   one or more processors configured to, when executing instructions stored in the memory, cause the UE to:
   perform a static DRX update by aggregating all DRX timers configured for the UE during each slot of one or more consecutive slots associated with a radio frame structure, until it is determined that all the DRX timers are expiring in a select slot of the one or more consecutive slots;
   upon performing the static DRX update in the select slot, compute an end of DRX active time based on an end time of one or more DRX timers of all the DRX timers; and
   perform a dynamic DRX event aggregation responsive to determining that all DRX events associated with physical downlink control channel (PDCCH) monitoring occasions (MOs) within the computed end of DRX active time have not been received.

2. The UE of claim 1, wherein the one or more processors are configured to perform the dynamic DRX event aggregation by receiving one or more subsequent DRX events and determining whether all the DRX events associated with the PDCCH MOs within the computed end of DRX active time are received, upon receiving each of the one or more subsequent DRX events.

3. The UE of claim 2, wherein the one or more processors are configured to perform the dynamic DRX event aggregation until it is determined that all the DRX events associated with the PDCCH MOs within the computed end of DRX active time are received or until an end of a current DRX cycle is reached, whichever is earlier.

4. The UE of claim 3, wherein, when all the DRX events associated with all the PDCCH MOs within the computed end of DRX active time are determined to be received, the one or more processors are configured to perform a dynamic DRX update by performing an aggregation of all the DRX timers configured for the UE and by determining whether the computed end of DRX active time is extended or not based on the aggregation of all the DRX timers.

5. The UE of claim 4, wherein the one or more processors are configured to determine that the computed end of DRX active time is extended when it is determined that all the DRX timers are not expired based on the aggregation of all the DRX timers performed as part of the dynamic DRX update.

6. The UE of claim 4, wherein, when it is determined that the computed end of DRX active time is extended as part of the dynamic DRX update, the one or more processors are configured to perform a static DRX aggregation procedure that comprises performing the static DRX update during each slot of one or more consecutive slots, from a current slot or from a next slot.

7. The UE of claim 4, wherein, when it is determined that the computed end of DRX active time is not extended as part of the dynamic DRX update, the one or more processors are configured to detect a DRX gap.

8. The UE of claim 7, wherein the detected DRX gap starts at a time instance immediately after a time of the dynamic DRX update.

9. The UE of claim 3, wherein, when all the DRX events associated with all the PDCCH MOs within the computed end of DRX active time are not received before the end of the current DRX cycle is reached, during the dynamic DRX event aggregation, the one or more processors are configured to perform a static DRX aggregation procedure that comprises performing the static DRX update during each slot of one or more consecutive slots, from a slot that starts immediately after the end of the current DRX cycle.

10. A baseband (BB) processor configured for discontinuous reception (DRX) operation and configured to, when executing instructions stored in a memory, perform operations comprising:
   performing a static DRX update by aggregating all DRX timers configured for the BB processor during each slot of one or more consecutive slots associated with a radio frame structure, until it is determined that all the DRX timers are expiring in a select slot of the one or more consecutive slots;
   computing an end of DRX active time based on an end time of one or more DRX timers of all the DRX timers, upon performing the static DRX update in the select slot; and detecting a DRX gap responsive to determining that all DRX events associated with physical downlink control channel (PDCCH) monitoring occasions (MOs) within the computed end of DRX active time have been received.

11. The BB processor of claim 10, wherein the operations further comprise performing a dynamic DRX event aggregation responsive to determining that all the DRX events associated with the PDCCH MOs within the computed end of DRX active time have not been received.

12. The BB processor of claim 10, wherein the static DRX update is performed at a predefined static DRX update time associated with each slot of the one or more consecutive slots.

13. The BB processor of claim 12, wherein a start time of the detected DRX gap coincides with the predefined static DRX update time associated with the select slot.

14. The BB processor of claim 10, wherein the static DRX update in each slot of the one or more consecutive slots is performed by further evaluating all the DRX timers aggregated in a respective slot against an end of the respective slot, and determining whether all the DRX timers expire in the respective slot in accordance with the evaluation in the respective slot.

15. The BB processor of claim 10, wherein the determination that all the DRX events associated with PDCCH MOs within the computed end of DRX active time are received or not is made, based on a PDCCH MO bitmap.

16. A method for a user equipment (UE) configured for discontinuous reception (DRX) operation, comprising:
performing a static DRX update, using one or more processors, by aggregating all DRX timers configured for the UE during each slot of one or more consecutive slots associated with a radio frame structure, until it is determined that all the DRX timers are expiring in a select slot of the one or more consecutive slots;
computing an end of DRX active time, using the one or more processors, based on an end time of one or more DRX timers of all the DRX timers, upon performing the static DRX update in the select slot;
performing a dynamic DRX event aggregation, using the one or more processors, responsive to determining that all DRX events associated with physical downlink control channel (PDCCH) monitoring occasions (MOs) within the computed end of DRX active time have not been received; and
detecting a DRX gap, using the one or more processors, responsive to determining that all the DRX events associated with the PDCCH MOs within the computed end of DRX active time have been received.

17. The method of claim 16, wherein the static DRX update is performed at a predefined static DRX update time associated with each slot of the one or more consecutive slots.

18. The method of claim 17, wherein a start time of the detected DRX gap coincides with the predefined static DRX update time associated with the select slot.

19. The method of claim 16, wherein the static DRX update in each slot of the one or more consecutive slots is performed by further evaluating all the DRX timers aggregated in a respective slot against an end of the respective slot, and determining whether all the DRX timers expire in the respective slot in accordance with the evaluation in the respective slot.

20. The method of claim 16, further comprising determining that all the DRX events associated with PDCCH MOs within the computed end of DRX active time have been received or not, using the one or more processors, upon computing the end of DRX active time.

* * * * *